(12) United States Patent
Masuda et al.

(10) Patent No.: US 12,462,419 B2
(45) Date of Patent: Nov. 4, 2025

(54) INSTRUCTION POSITION DETECTION DEVICE, INSTRUCTION POSITION DETECTION METHOD, INSTRUCTION POSITION DETECTION PROGRAM, AND PROJECTION SYSTEM

(71) Applicant: FUJIFILM Corporation, Tokyo (JP)

(72) Inventors: Tomonori Masuda, Saitama (JP); Kazuki Inoue, Saitama (JP); Akihiro Ishizuka, Saitama (JP); Kazuki Ishida, Saitama (JP)

(73) Assignee: FUJIFILM Corporation, Tokyo (JP)

(*) Notice: Subject to any disclaimer, the term of this patent is extended or adjusted under 35 U.S.C. 154(b) by 450 days.

(21) Appl. No.: 18/168,830

(22) Filed: Feb. 14, 2023

(65) Prior Publication Data
US 2023/0196606 A1 Jun. 22, 2023

Related U.S. Application Data

(63) Continuation of application No. PCT/JP2021/008307, filed on Mar. 3, 2021.

(30) Foreign Application Priority Data

Aug. 28, 2020 (JP) ................. 2020-144981

(51) Int. Cl.
G06V 10/74 (2022.01)
G02B 7/10 (2021.01)
G06T 7/70 (2017.01)

(52) U.S. Cl.
CPC .................. G06T 7/70 (2017.01); G02B 7/10 (2013.01); G06V 10/761 (2022.01)

(58) Field of Classification Search
CPC ........ G06T 7/70; G06V 10/74; G06V 10/761; G02B 7/10
See application file for complete search history.

(56) References Cited

U.S. PATENT DOCUMENTS

2009/0066647 A1 3/2009 Kerr et al.
2009/0066648 A1* 3/2009 Kerr ...................... G06F 3/0485
345/158

(Continued)

FOREIGN PATENT DOCUMENTS

CN 103186018 A 7/2013
JP 2007-114820 A 5/2007

(Continued)

OTHER PUBLICATIONS

International Preliminary Report on Patentability (Form PCT/IPEA/409) for International Application No. PCT/JP2021/008307, dated Nov. 9, 2021, with English translation.

(Continued)

*Primary Examiner* — Shaghayegh Azima
(74) *Attorney, Agent, or Firm* — Birch, Stewart, Kolasch & Birch, LLP

(57) ABSTRACT

An instruction position detection device includes: a processor that acquires a movement amount of an instruction position of an indicator capable of detecting the movement amount, and performs a control of projecting, from a projection apparatus, an image including a setting image for setting an origin of the instruction position of the indicator, and the processor is configured to: acquire an input result of a setting operation of an operator in a state where an instruction for a position indicated by the setting image in a projected projection image is provided by the indicator; and perform a control of detecting the instruction position of the indicator in the image based on the position of the setting image in the image and the movement amount after the input result of the setting operation is acquired.

16 Claims, 20 Drawing Sheets

(56) References Cited

U.S. PATENT DOCUMENTS

2009/0322676 A1    12/2009   Kerr et al.
2015/0227262 A1*   8/2015   Ichieda ................ G06F 3/0425
                                                                                                345/204

FOREIGN PATENT DOCUMENTS

| JP | 2008-250562 A | 10/2008 | |
|----|---------------|---------|---|
| JP | 2008250562 * | 10/2008 | |
| JP | 2010-538400 A | 12/2010 | |
| JP | 2012-27769 A | 2/2012 | |
| JP | 2012-216928 A | 11/2012 | |
| JP | 2017-68001 A | 4/2017 | |
| JP | 2017-102461 A | 6/2017 | |
| JP | 2020-122696 A | 8/2020 | |
| WO | WO 2018/020497 A1 | 2/2018 | |
| WO | WO-2020008877 A1 * | 1/2020 | ........... G06F 3/0386 |

OTHER PUBLICATIONS

International Search Report (Form PCT/ISA/210) for International Application No. PCT/JP2021/008307, dated May 18, 2021, with English translation.
Written Opinion of the International Searching Authority (Form PCT/ISA/237) for International Application No. PCT/JP2021/008307, dated May 18, 2021.
Chinese Office Action and Search Report for corresponding Chinese Application No. 202180052530.9, dated May 1, 2025, with English translation.

* cited by examiner

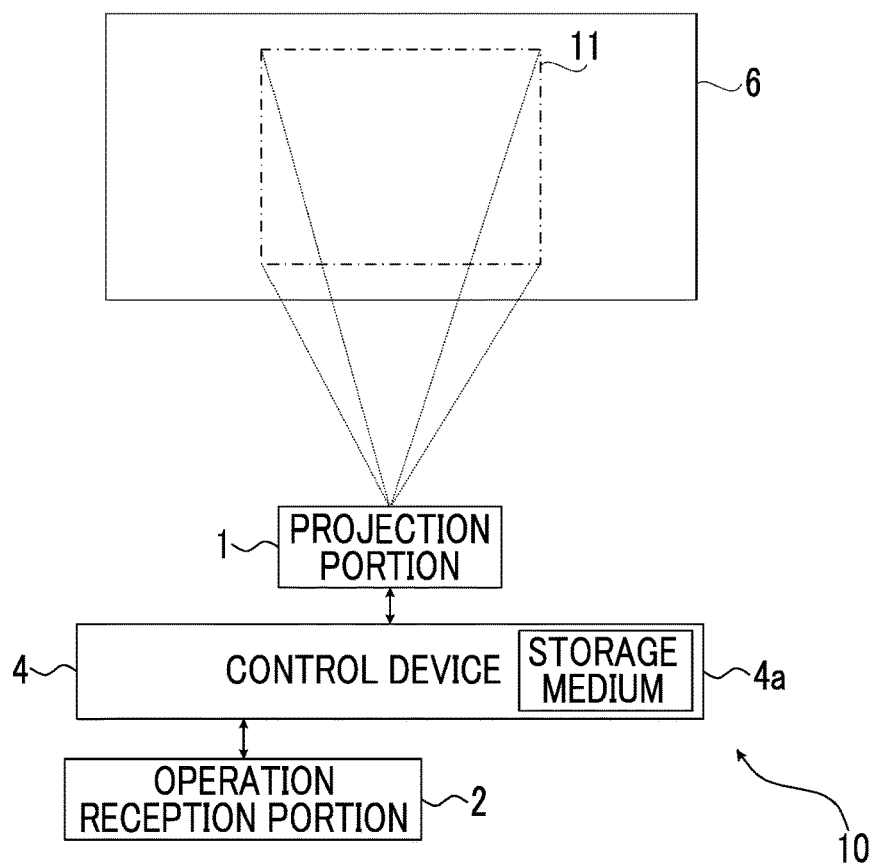
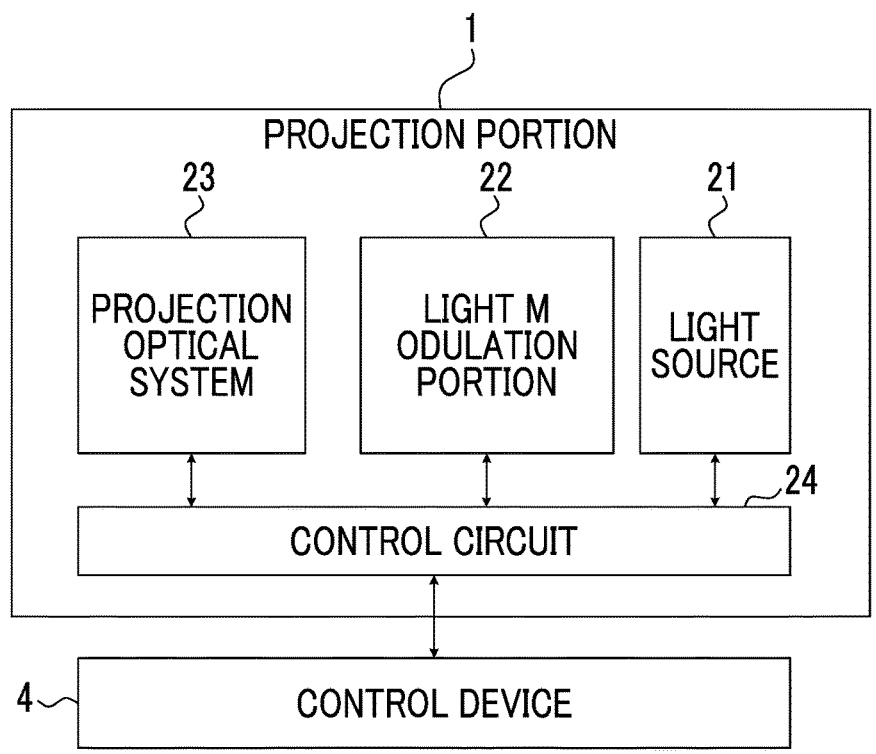

FIG. 5
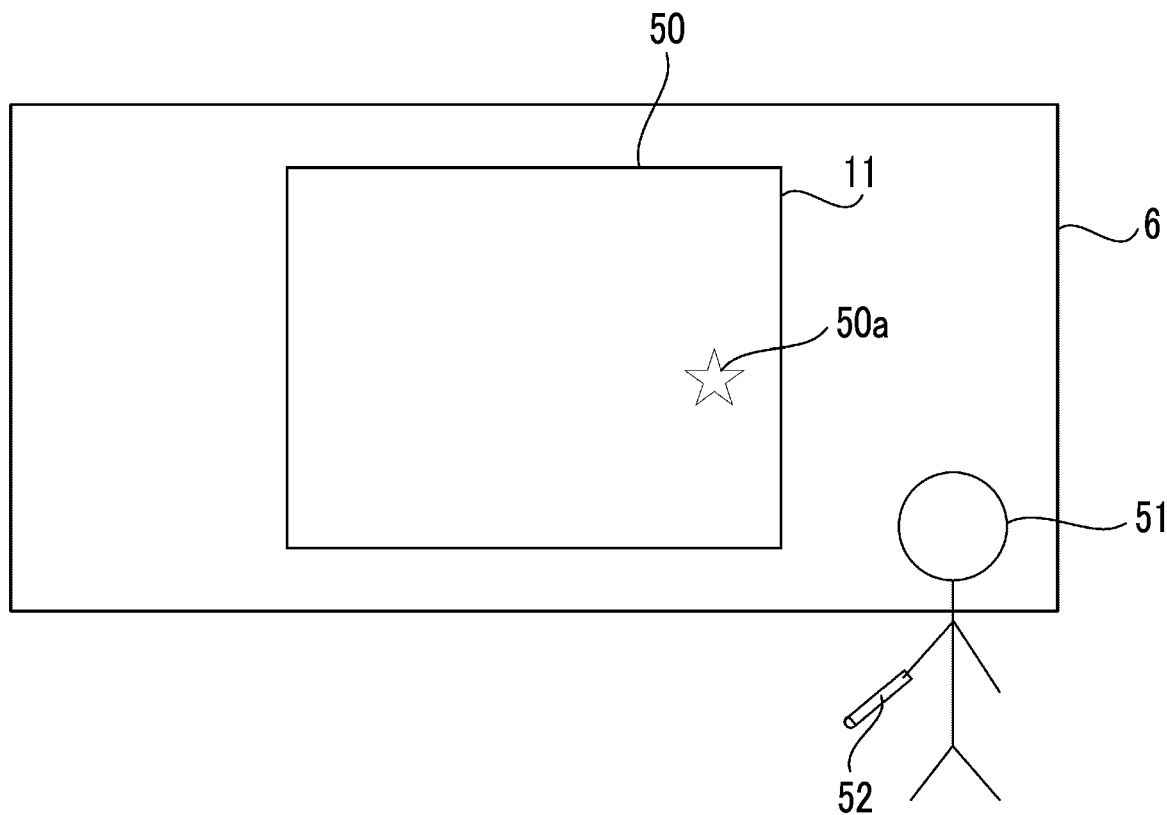
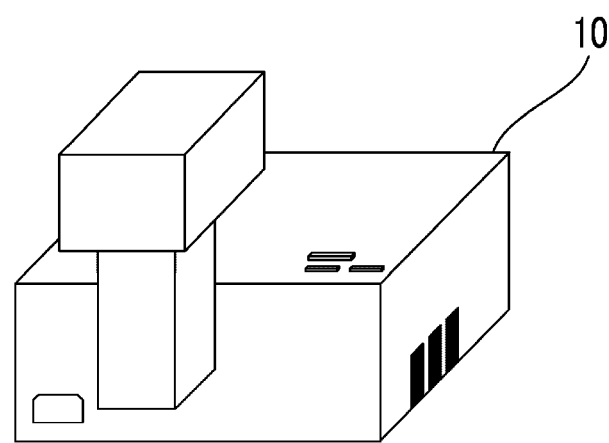

FIG. 6
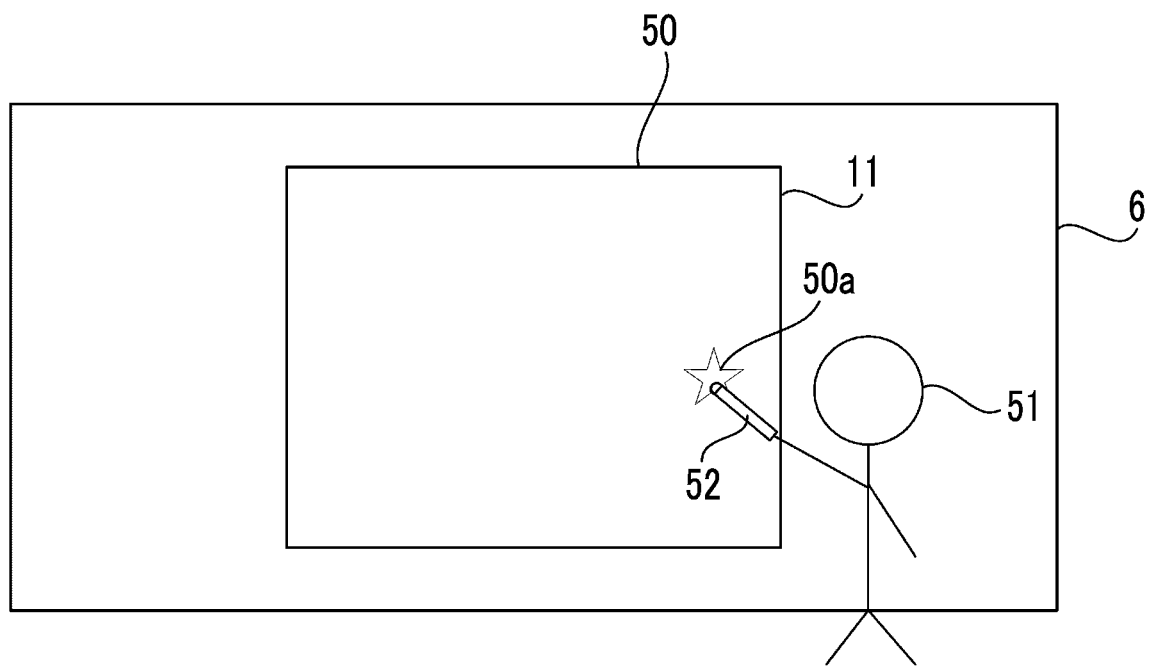
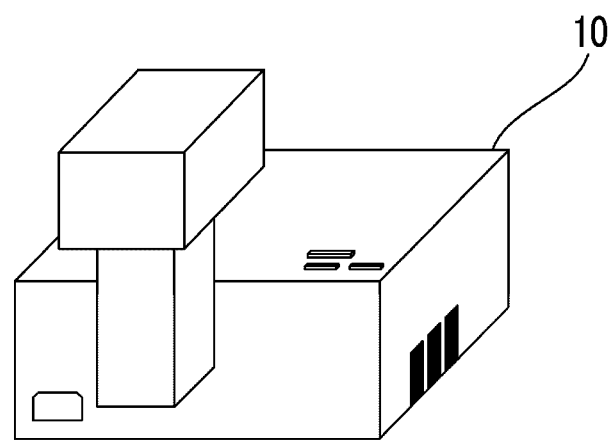

FIG. 7
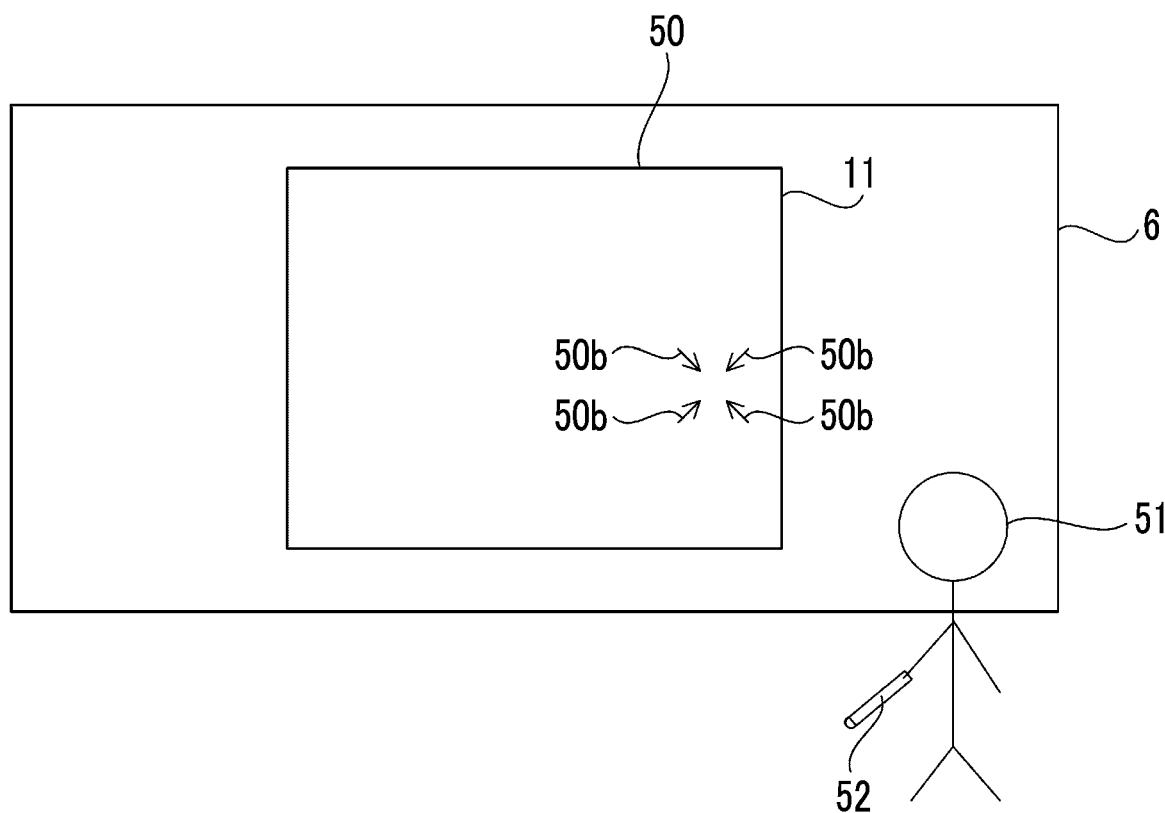
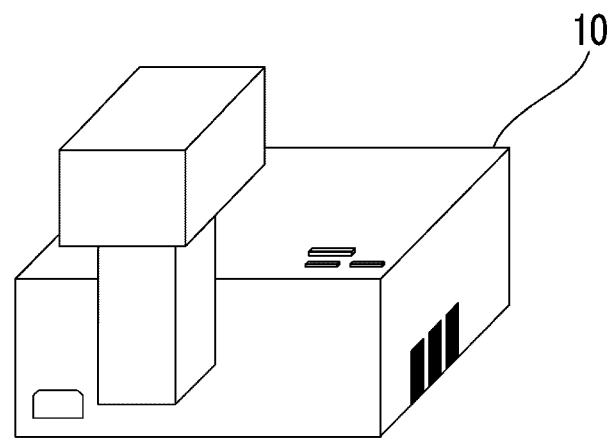

FIG. 8
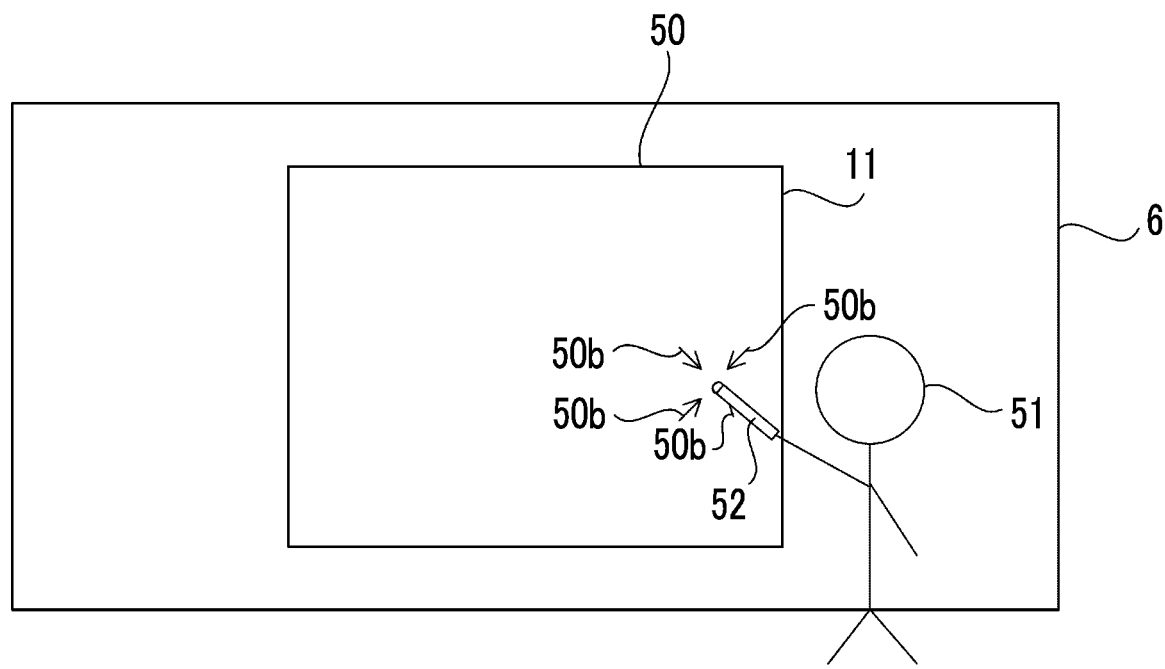
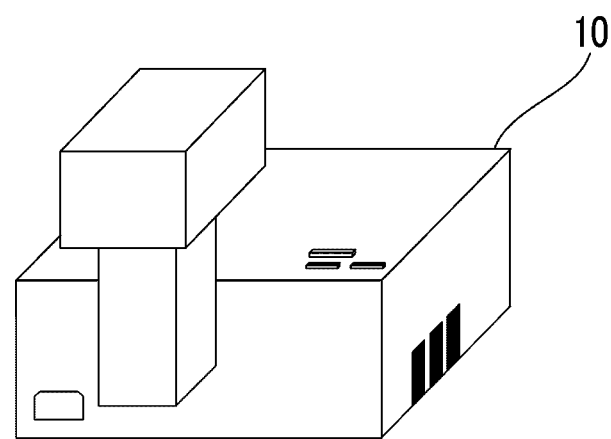

FIG. 9
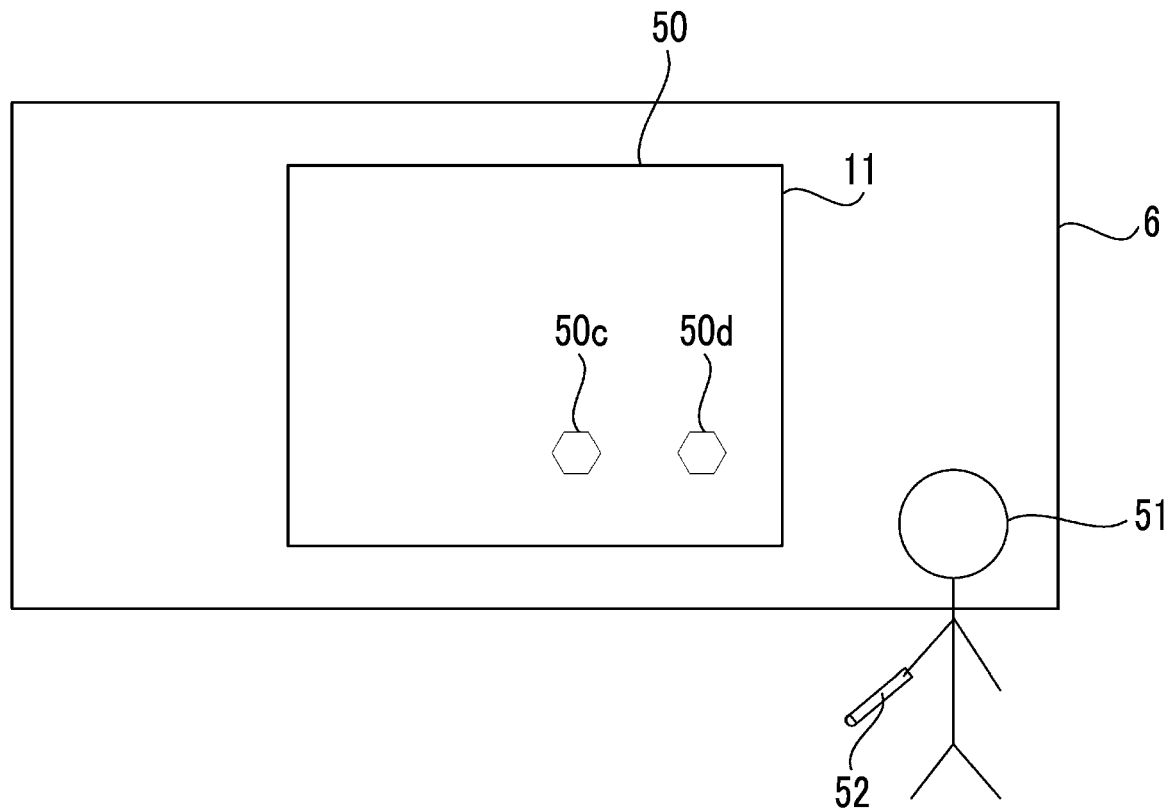
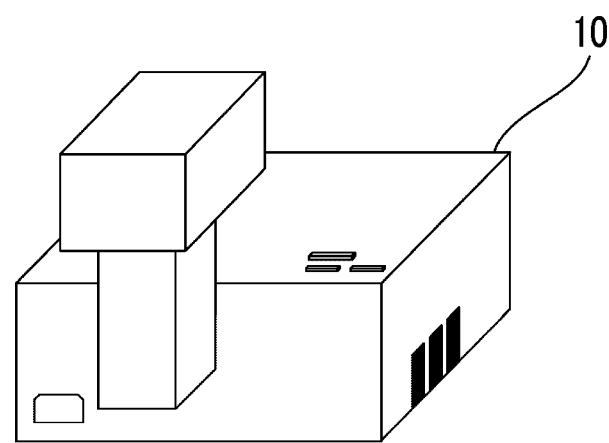

FIG. 10
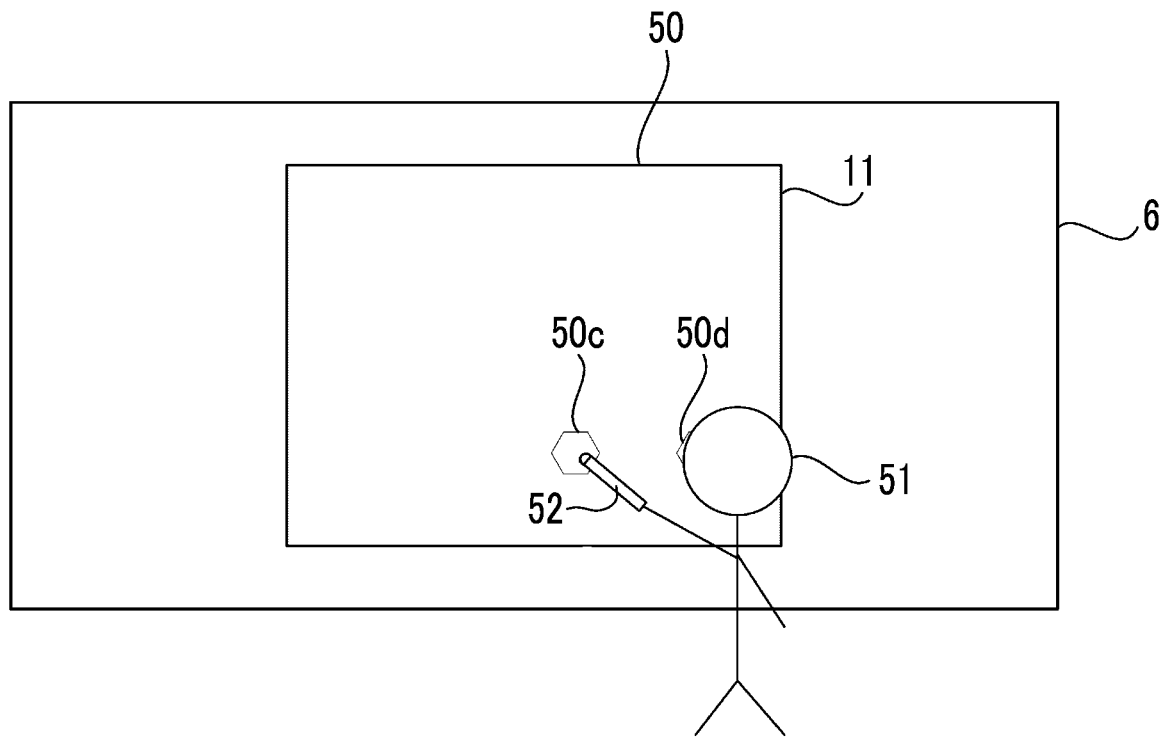
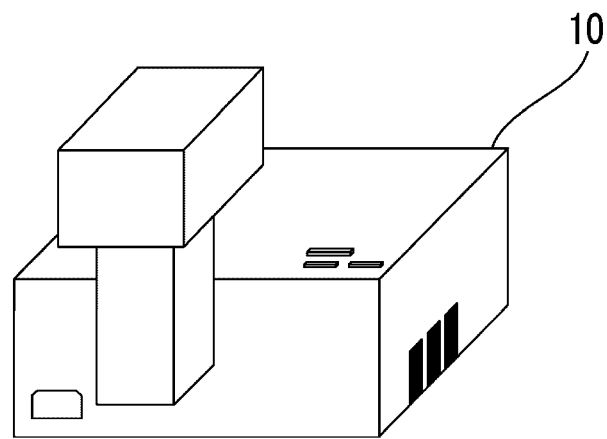

FIG. 11
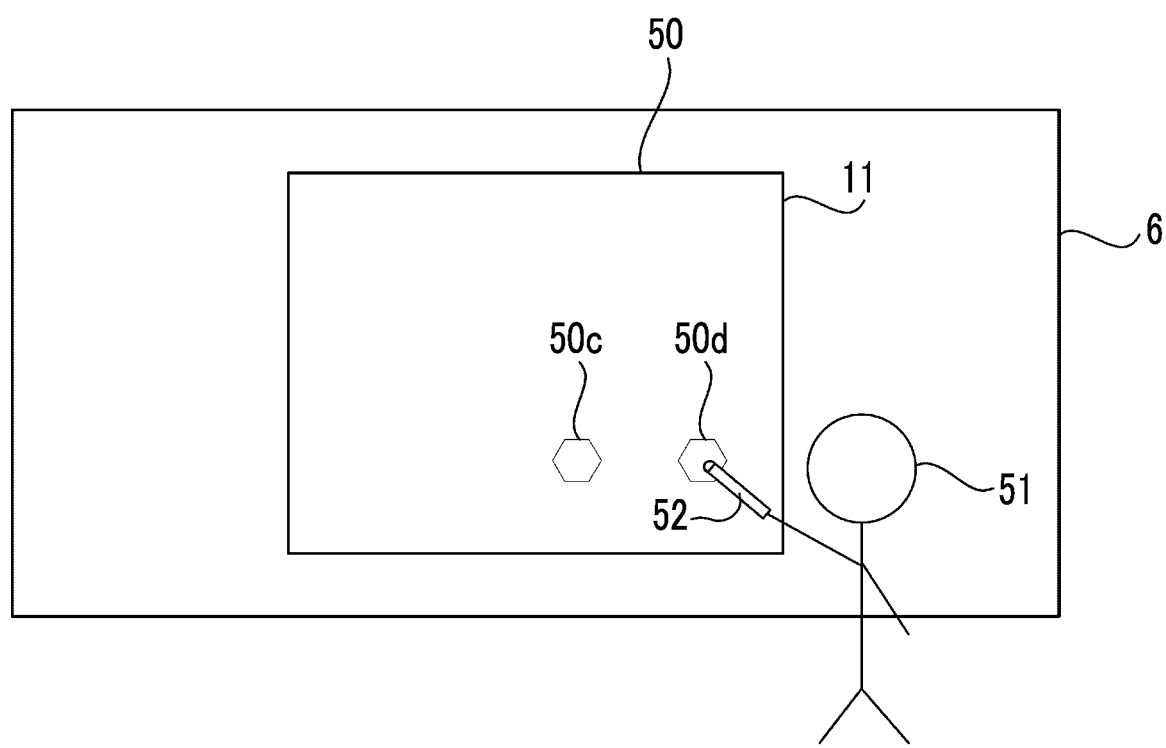
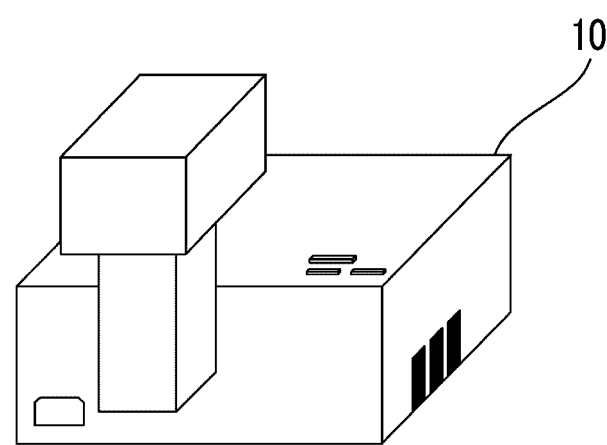

FIG. 12
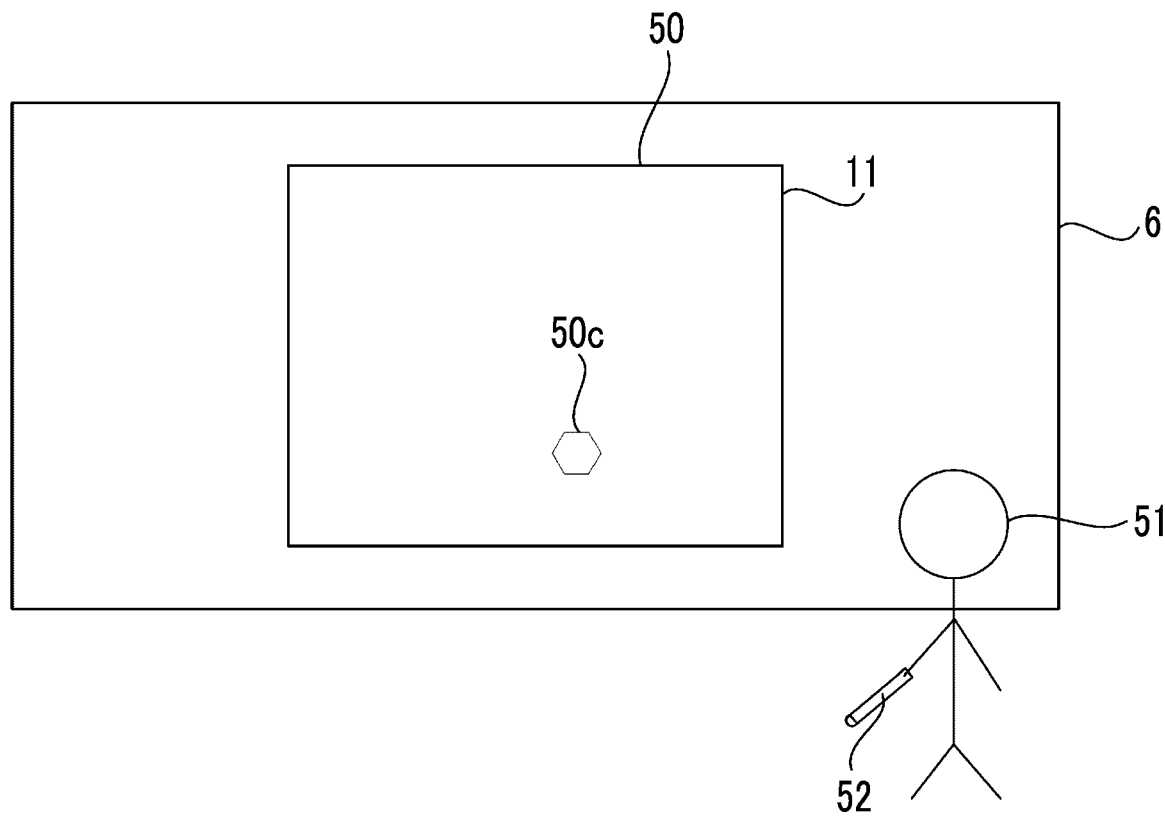
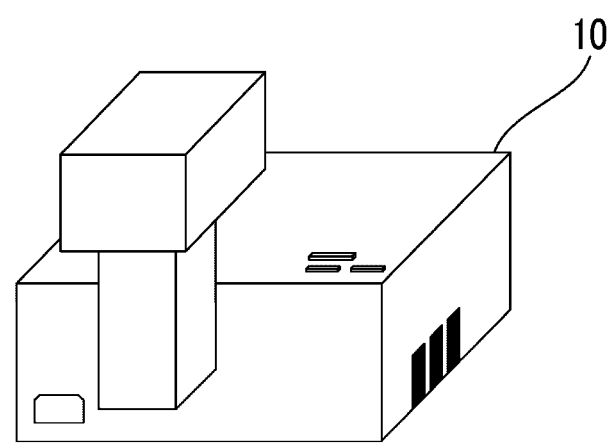

FIG. 13
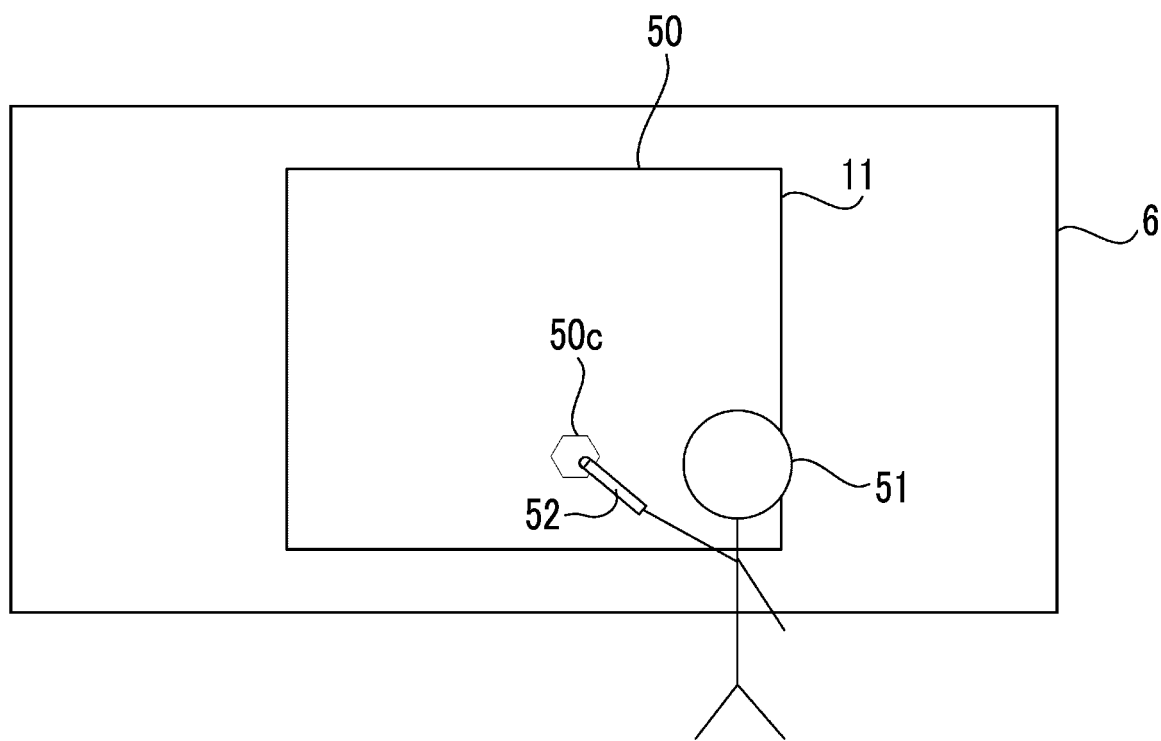
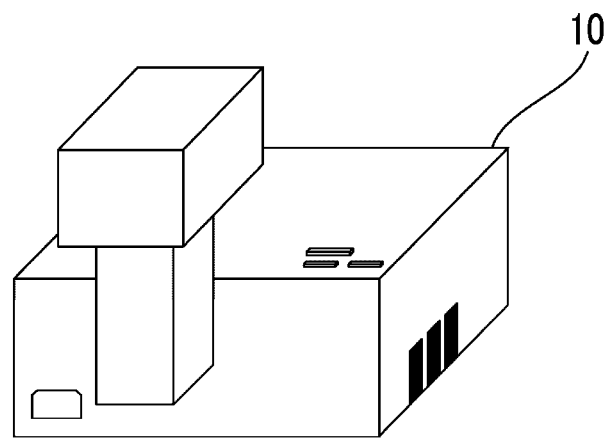

FIG. 14
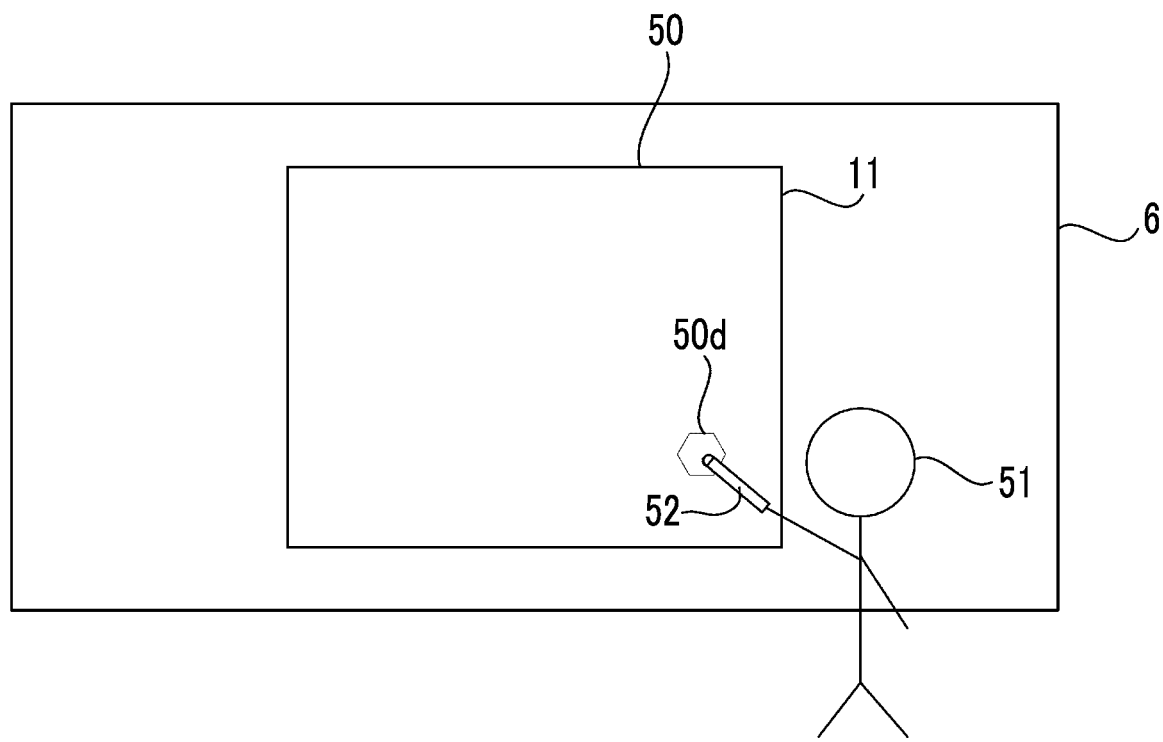
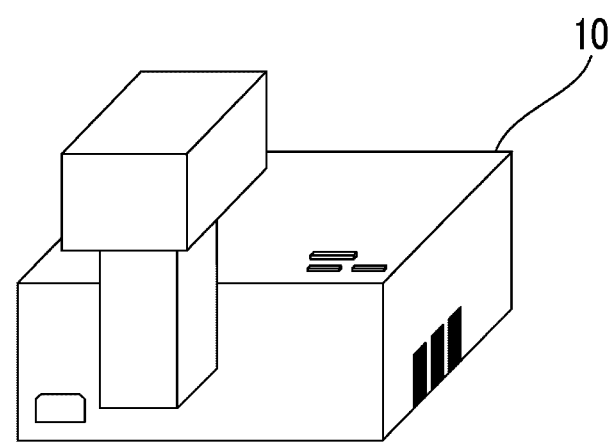

FIG. 15
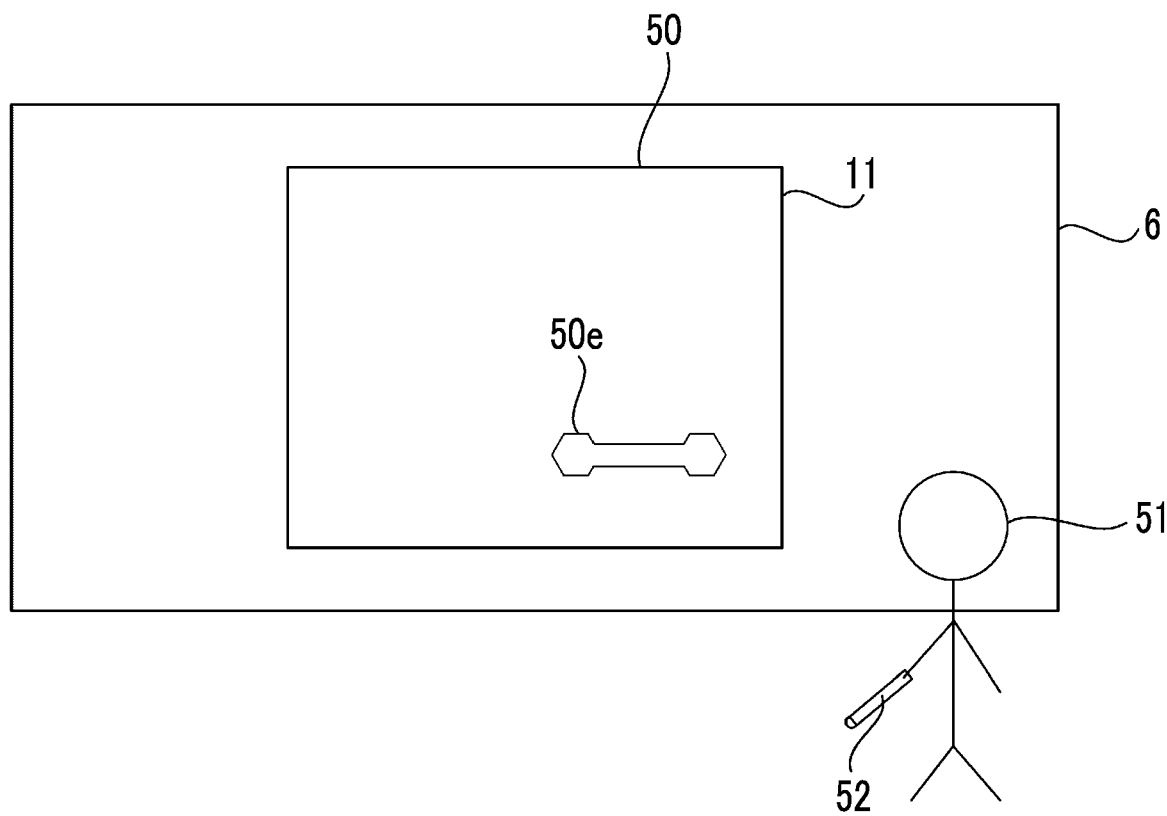
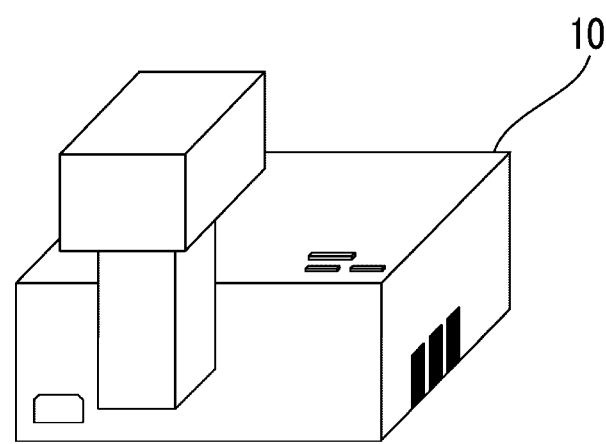

FIG. 16
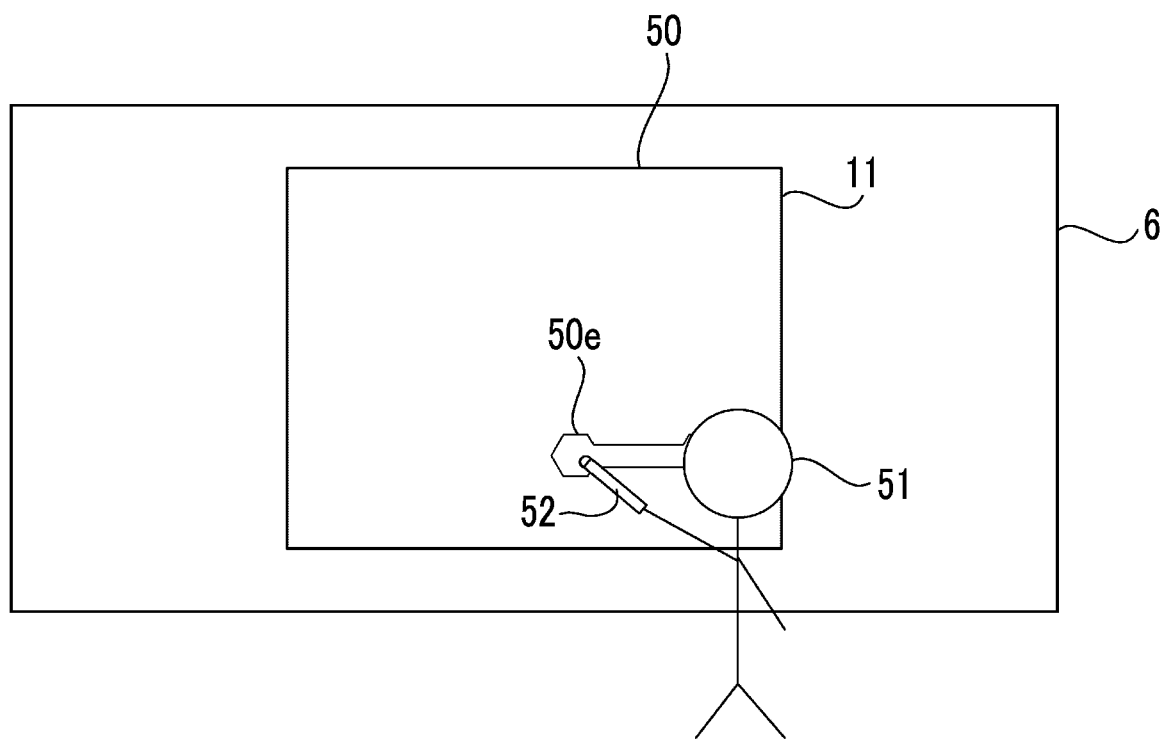
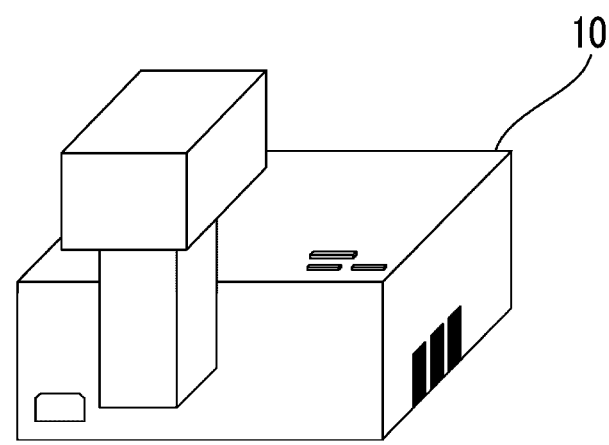

FIG. 17
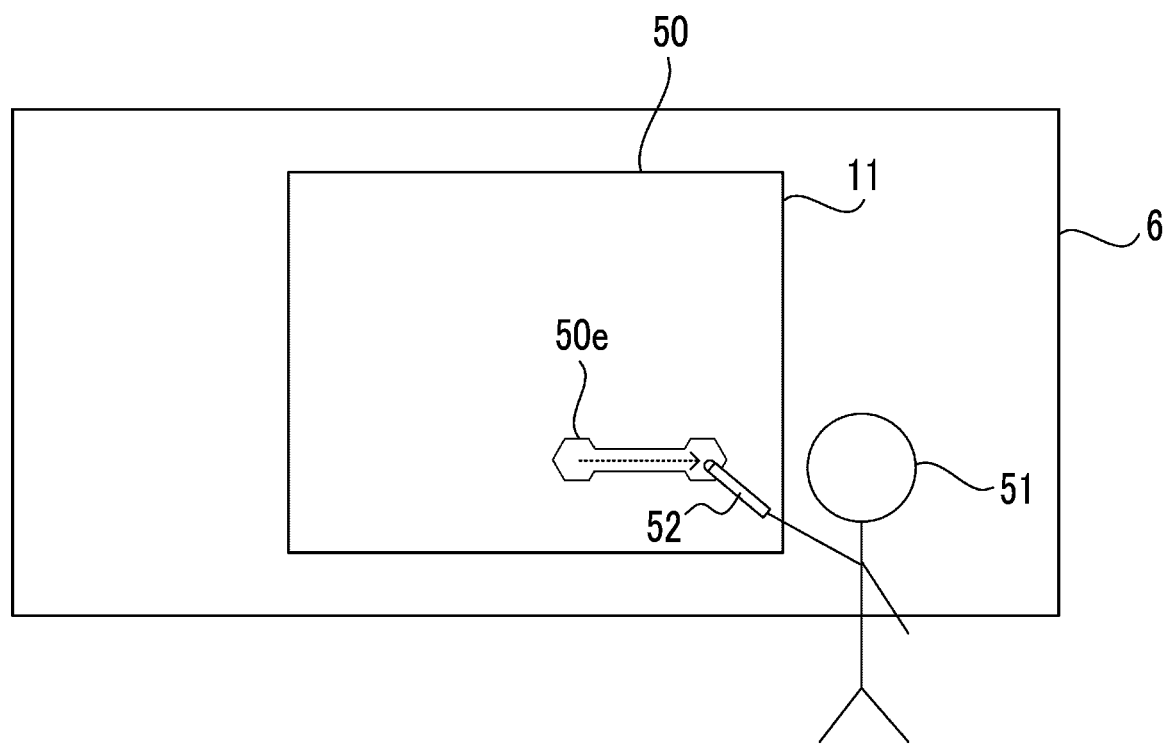
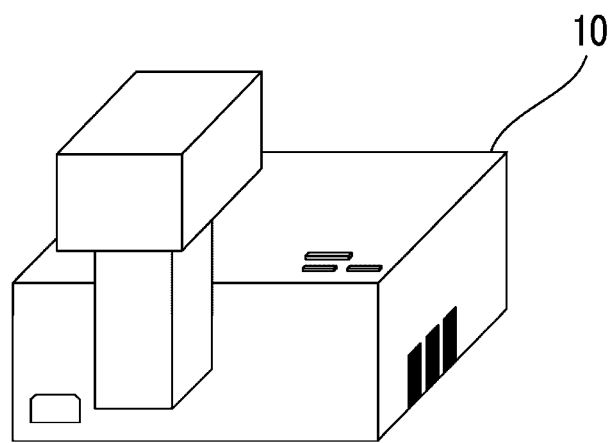

FIG. 18
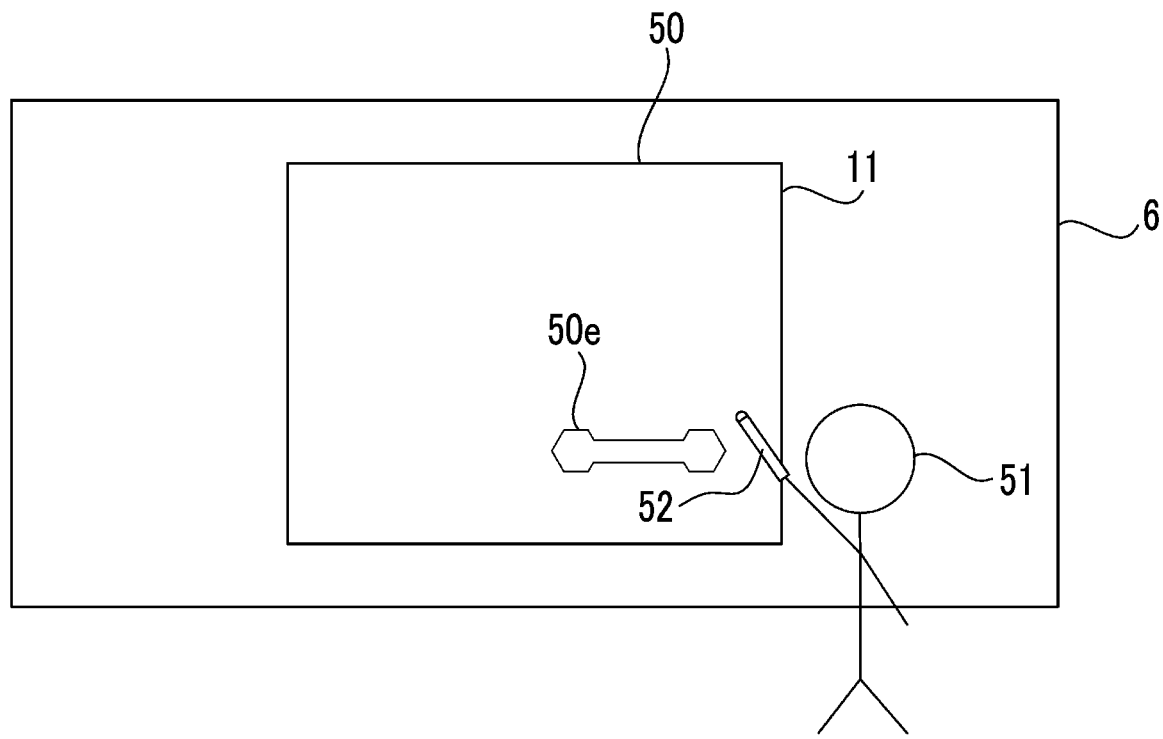
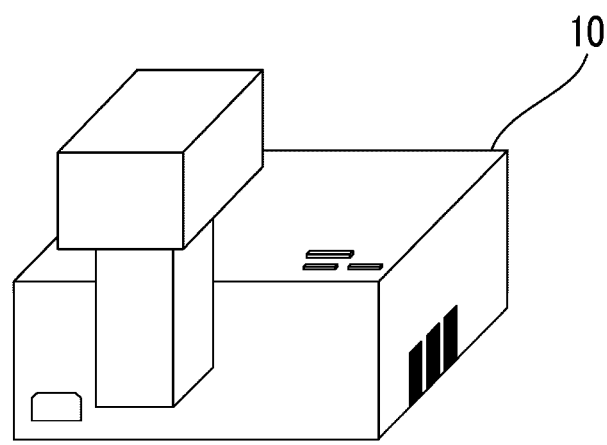

FIG. 20
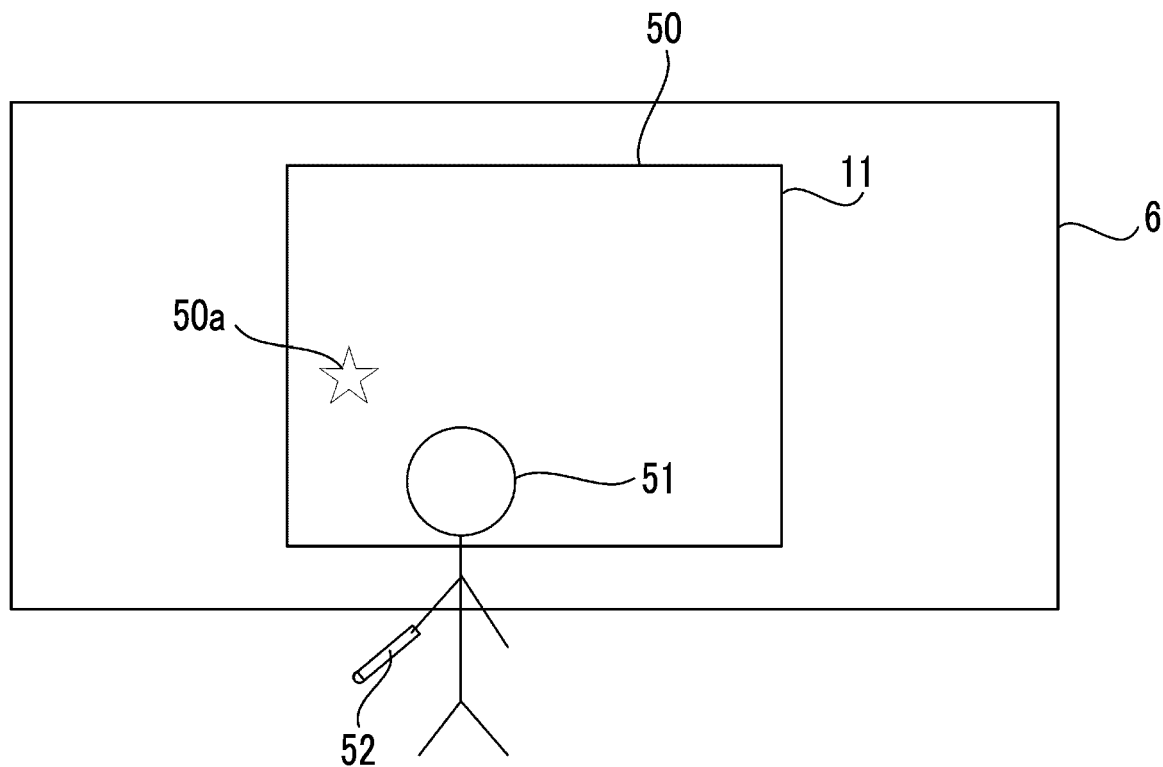
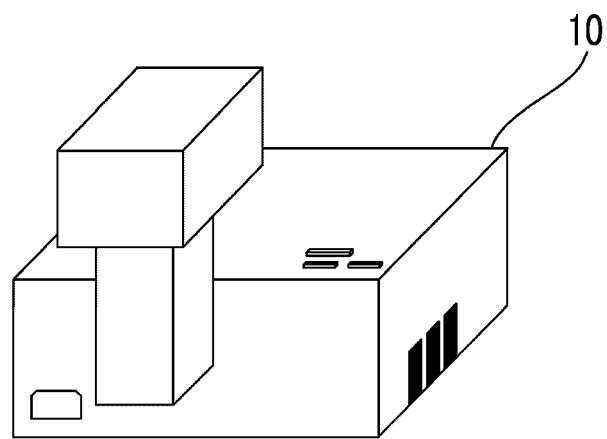

INSTRUCTION POSITION DETECTION DEVICE, INSTRUCTION POSITION DETECTION METHOD, INSTRUCTION POSITION DETECTION PROGRAM, AND PROJECTION SYSTEM

CROSS REFERENCE TO RELATED APPLICATION

This is a continuation of International Application No. PCT/JP2021/008307 filed on Mar. 3, 2021, and claims priority from Japanese Patent Application No. 2020-144981 filed on Aug. 28, 2020, the entire disclosures of which are incorporated herein by reference.

BACKGROUND OF THE INVENTION

1. Field of the Invention

The present invention relates to an instruction position detection device, an instruction position detection method, a computer readable medium storing an instruction position detection program, and a projection system.

2. Description of the Related Art

WO2018/020497A discloses a configuration of detecting a position of a projection point of an instruction device using a hybrid tracking system consisting of an optical tracking sub-system and a motion/direction detection sub-system. JP2012-216928A discloses a configuration of transmitting data obtained by reading positional coordinate information that is superimposed on a projection image and that is invisible to the naked eye, and data detected by an incorporated three-axis acceleration sensor or the like to a data projector apparatus, and of calculating a point position based on each data by a CPU in the data projector apparatus. JP2010-538400A discloses a configuration in which a position of a wand is detected using a motion detection element such as an acceleration sensor in addition to transmission and reception to and from an infrared module.

SUMMARY OF THE INVENTION

One embodiment according to the disclosed technology provides an instruction position detection device, an instruction position detection method, a computer readable medium storing an instruction position detection program, and a projection system that can detect an instruction position of an indicator in an image used for projection.

An instruction position detection device according to one embodiment of the disclosed technology comprises a processor that acquires a movement amount of an instruction position of an indicator capable of detecting the movement amount, and performs a control of projecting an image including a setting image for setting an origin of the instruction position of the indicator from a projection apparatus, in which the processor is configured to acquire an input result of a setting operation of an operator in a state where an instruction for a position indicated by the setting image in a projected projection image is provided by the indicator, and perform a control of detecting the instruction position of the indicator in the image based on the position of the setting image in the image and the movement amount after the input result of the setting operation is acquired.

An instruction position detection method according to one embodiment of the disclosed technology comprises, by a processor of an instruction position detection device, acquiring a movement amount of an instruction position of an indicator capable of detecting the movement amount, performing a control of projecting an image including a setting image for setting an origin of the instruction position of the indicator from a projection apparatus, acquiring an input result of a setting operation of an operator in a state where an instruction for a position indicated by the setting image in a projected projection image is provided by the indicator, and performing a control of detecting the instruction position of the indicator in the image based on the position of the setting image in the image and the movement amount after the input result of the setting operation is acquired.

An instruction position detection program, which is stored in a computer readable medium, according to one embodiment of the disclosed technology causes a processor of an instruction position detection device to execute a process comprising acquiring a movement amount of an instruction position of an indicator capable of detecting the movement amount, performing a control of projecting an image including a setting image for setting an origin of the instruction position of the indicator from a projection apparatus, acquiring an input result of a setting operation of an operator in a state where an instruction for a position indicated by the setting image in a projected projection image is provided by the indicator, and performing a control of detecting the instruction position of the indicator in the image based on the position of the setting image in the image and the movement amount after the input result of the setting operation is acquired.

A projection system according to one embodiment of the present invention comprises a projection apparatus, and an instruction position detection device that acquires a movement amount of an instruction position of an indicator capable of detecting the movement amount, performs a control of projecting an image including a setting image for setting an origin of the instruction position of the indicator from the projection apparatus, acquires an input result of a setting operation of an operator in a state where an instruction for a position indicated by the setting image in a projected projection image is provided by the indicator, and detects the instruction position of the indicator in the image based on the position of the setting image in the image and the movement amount after the input result of the setting operation is acquired.

According to the present invention, an instruction position detection device, an instruction position detection method, a computer readable medium storing an instruction position detection program, and a projection system that can detect an instruction position of an indicator in an image used for projection can be provided.

BRIEF DESCRIPTION OF THE DRAWINGS

FIG. 1 is a schematic diagram illustrating a schematic configuration of a projection apparatus 10 to which an instruction position detection device of an embodiment is applied.

FIG. 2 is a schematic diagram illustrating an example of an internal configuration of a projection portion 1 illustrated in FIG. 1.

FIG. 5 is a diagram (Part 1) illustrating Specific Example 1 of a setting image for setting an origin and an origin setting operation.

FIG. 6 is a diagram (Part 2) illustrating Specific Example 1 of the setting image for setting the origin and the origin setting operation.

FIG. 7 is a diagram (Part 1) illustrating Specific Example 2 of the setting image for setting the origin and the origin setting operation.

FIG. 8 is a diagram (Part 2) illustrating Specific Example 2 of the setting image for setting the origin and the origin setting operation.

FIG. 9 is a diagram (Part 1) illustrating Specific Example 1 of a setting image for generating first information, a first setting operation, and a second setting operation.

FIG. 10 is a diagram (Part 2) illustrating Specific Example 1 of the setting image for generating the first information, the first setting operation, and the second setting operation.

FIG. 11 is a diagram (Part 3) illustrating Specific Example 1 of the setting image for generating the first information, the first setting operation, and the second setting operation.

FIG. 12 is a diagram (Part 1) illustrating Specific Example 2 of the setting image for generating the first information, the first setting operation, and the second setting operation.

FIG. 13 is a diagram (Part 2) illustrating Specific Example 2 of the setting image for generating the first information, the first setting operation, and the second setting operation.

FIG. 14 is a diagram (Part 3) illustrating Specific Example 2 of the setting image for generating the first information, the first setting operation, and the second setting operation.

FIG. 15 is a diagram (Part 1) illustrating Specific Example 3 of the setting image for generating the first information, the first setting operation, and the second setting operation.

FIG. 16 is a diagram (Part 2) illustrating Specific Example 3 of the setting image for generating the first information, the first setting operation, and the second setting operation.

FIG. 17 is a diagram (Part 3) illustrating Specific Example 3 of the setting image for generating the first information, the first setting operation, and the second setting operation.

FIG. 18 is a diagram (Part 4) illustrating Specific Example 3 of the setting image for generating the first information, the first setting operation, and the second setting operation.

FIG. 20 is a diagram illustrating an example of a control of a position of the setting image based on a detection result of an instruction position.

DESCRIPTION OF THE PREFERRED EMBODIMENTS

Figure 3:
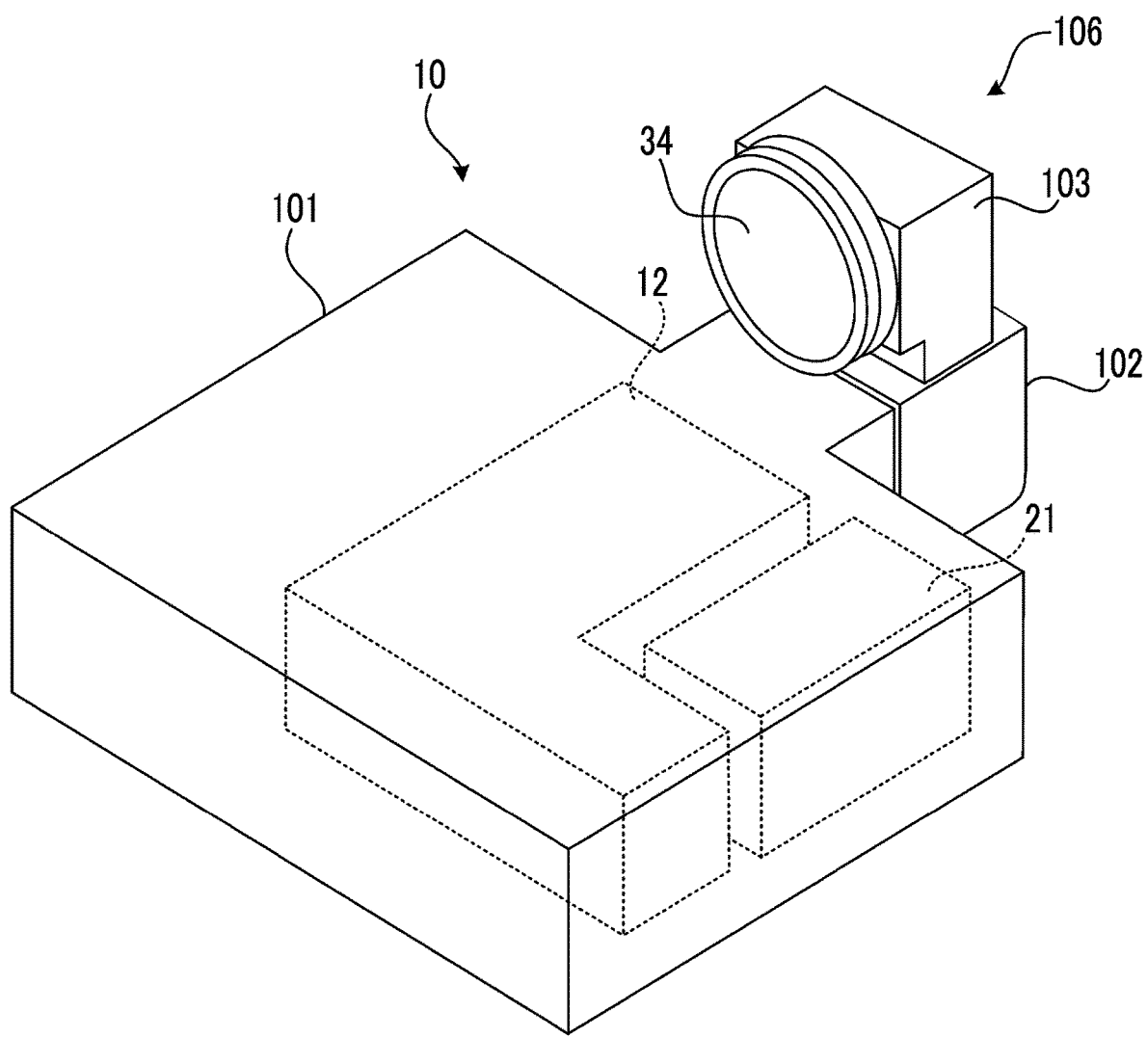
FIG. 3 is a schematic diagram illustrating an exterior configuration of the projection apparatus 10.

Hereinafter, an example of an embodiment of the present invention will be described with reference to the drawings.

<Schematic Configuration of Projection Apparatus 10 to Which Instruction Position Detection Device of Embodiment Is Applied>

FIG. 1 is a schematic diagram illustrating a schematic configuration of a projection apparatus 10 to which an instruction position detection device of the embodiment is applied.

The projection apparatus 10 comprises a projection portion 1, a control device 4, and an operation reception portion 2. The projection portion 1 is configured with, for example, a liquid crystal projector or a projector using liquid crystal on silicon (LCOS). Hereinafter, the projection portion 1 will be described as a liquid crystal projector.

The control device 4 controls projection performed by the projection apparatus 10. In addition, the control device 4 is an example of the instruction position detection device according to the embodiment of the present invention. The control device 4 is a device including a control portion configured with various processors, a communication interface (not illustrated) for communicating with each portion, and a storage medium 4a such as a hard disk, a solid state drive (SSD), or a read only memory (ROM) and manages and controls the projection portion 1. Examples of the various processors of the control portion of the control device 4 include a central processing unit (CPU) that is a general-purpose processor performing various processing by executing a program, a programmable logic device (PLD) such as a field programmable gate array (FPGA) that is a processor having a circuit configuration changeable after manufacturing, or a dedicated electric circuit such as an application specific integrated circuit (ASIC) that is a processor having a circuit configuration dedicatedly designed to execute specific processing.

More specifically, a structure of these various processors is an electric circuit in which circuit elements such as semiconductor elements are combined. The control portion of the control device 4 may be configured with one of the various processors or may be configured with a combination of two or more processors of the same type or different types (for example, a combination of a plurality of FPGAs or a combination of a CPU and an FPGA).

The operation reception portion 2 detects an instruction (user instruction) from a user by receiving various operations from the user. The operation reception portion 2 may be a button, a key, a joystick, or the like provided in the control device 4 or a reception portion or the like that receives a signal from a remote controller for remotely operating the control device 4.

A projection object 6 is an object such as a screen having a projection surface on which a projection image is displayed by the projection portion 1. In the example illustrated in FIG. 1, the projection surface of the projection object 6 is a rectangular plane. It is assumed that upper, lower, left, and right sides of the projection object 6 in FIG. 1 are upper, lower, left, and right sides of the actual projection object 6.

A projection region 11 illustrated by a dot dashed line is a region irradiated with projection light by the projection portion 1 in the projection object 6. In the example illustrated in FIG. 1, the projection region 11 is rectangular. The projection region 11 is a part or the entirety of a projectable range in which the projection can be performed by the projection portion 1.

Figure 4:
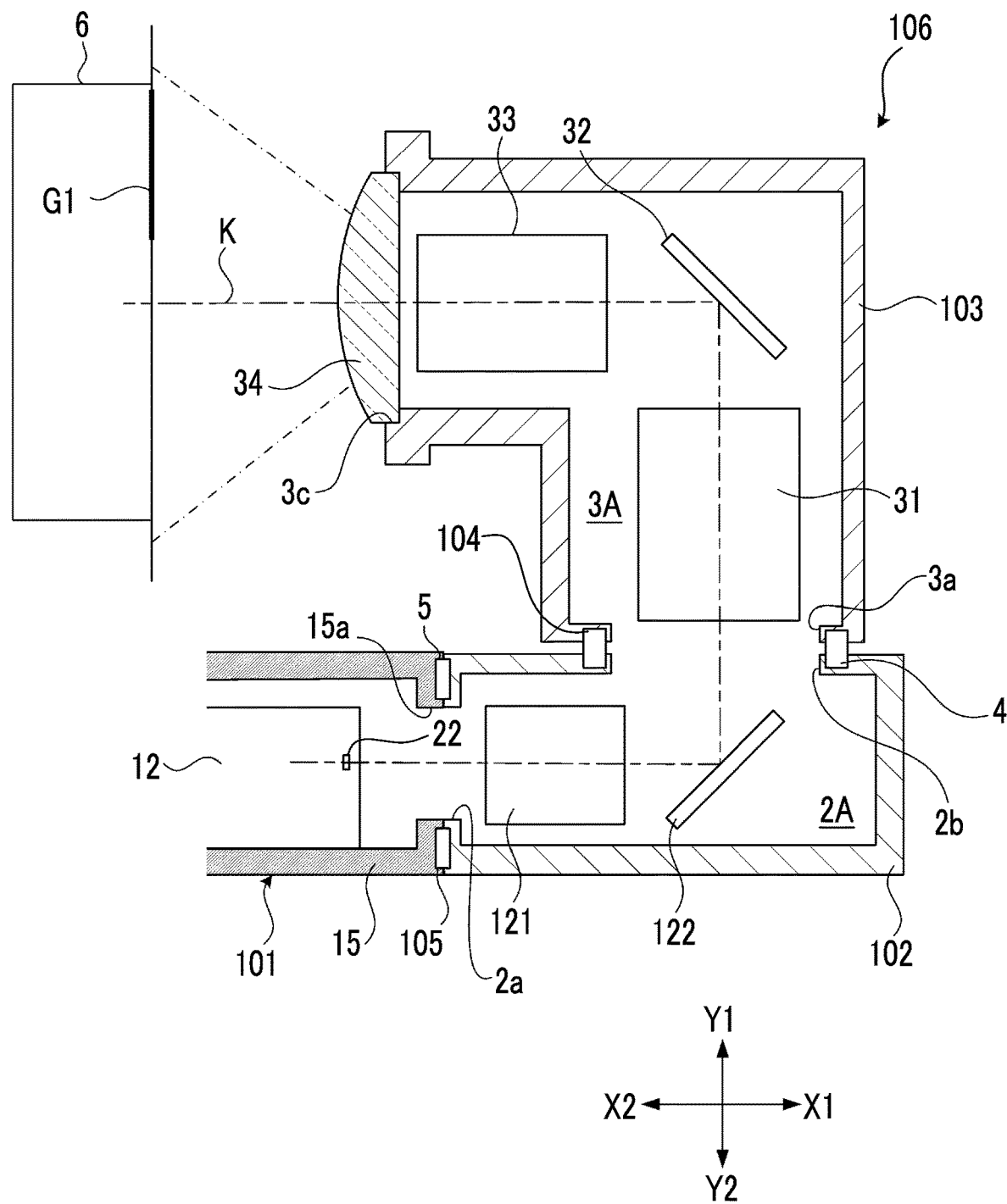
FIG. 4 is a schematic cross-sectional view of an optical unit 106 of the projection apparatus 10 illustrated in FIG. 3.

The projection portion 1, the control device 4, and the operation reception portion 2 are implemented by, for example, one device (for example, refer to FIG. 3 and FIG. 4). Alternatively, the projection portion 1, the control device 4, and the operation reception portion 2 may be separate devices that cooperate by communicating with each other.

<Internal Configuration of Projection Portion 1 Illustrated in FIG. 1>

FIG. 2 is a schematic diagram illustrating an example of an internal configuration of the projection portion 1 illustrated in FIG. 1.

As illustrated in FIG. 2, the projection portion 1 comprises a light source 21, a light modulation portion 22, a projection optical system 23, and a control circuit 24.

The light source 21 includes a light emitting element such as a laser or a light emitting diode (LED) and emits, for example, white light.

The light modulation portion 22 is configured with three liquid crystal panels that emit each color image by modulating, based on image information, each color light which is emitted from the light source 21 and is separated into three colors of red, blue, and green by a color separation mechanism, not illustrated. Filters of red, blue, and green may be mounted in each of the three liquid crystal panels, and each color image may be emitted by modulating the white light emitted from the light source 21 in each liquid crystal panel.

The light from the light source 21 and the light modulation portion 22 is incident on the projection optical system 23. The projection optical system 23 includes at least one lens and is composed of, for example, a relay optical system. The light that has passed through the projection optical system 23 is projected to the projection object 6.

In the projection object 6, a region irradiated with the light transmitted through the entire range of the light modulation portion 22 is the projectable range in which the projection can be performed by the projection portion 1. In the projectable range, a region irradiated with the light actually transmitted through the light modulation portion 22 is the projection region 11. For example, in the projectable range, a size, a position, and a shape of the projection region 11 are changed by controlling a size, a position, and a shape of a region through which the light is transmitted in the light modulation portion 22.

The control circuit 24 projects an image based on display data to the projection object 6 by controlling the light source 21, the light modulation portion 22, and the projection optical system 23 based on the display data input from the control device 4. The display data input into the control circuit 24 is configured with three constituents of red display data, blue display data, and green display data.

In addition, the control circuit 24 enlarges or reduces the projection region 11 (refer to FIG. 1) of the projection portion 1 by changing the projection optical system 23 based on an instruction input from the control device 4. In addition, the control device 4 may move the projection region 11 of the projection portion 1 by changing the projection optical system 23 based on the operation received by the operation reception portion 2 from the user.

In addition, the projection apparatus 10 comprises a shift mechanism that mechanically or optically moves the projection region 11 while maintaining an image circle of the projection optical system 23. The image circle of the projection optical system 23 is a region in which the projection light incident on the projection optical system 23 appropriately passes through the projection optical system 23 in terms of a light fall-off, color separation, edge part curvature, or the like.

The shift mechanism is implemented by at least any of an optical system shift mechanism that performs optical system shifting, or an electronic shift mechanism that performs electronic shifting.

The optical system shift mechanism is, for example, a mechanism (for example, refer to FIG. 3 and FIG. 4) that moves the projection optical system 23 in a direction perpendicular to an optical axis, or a mechanism that moves the light modulation portion 22 in the direction perpendicular to the optical axis instead of moving the projection optical system 23. In addition, the optical system shift mechanism may perform the movement of the projection optical system 23 and the movement of the light modulation portion 22 in combination.

The electronic shift mechanism is a mechanism that performs pseudo shifting of the projection region 11 by changing a range through which the light is transmitted in the light modulation portion 22.

In addition, the projection apparatus 10 may comprise a projection direction changing mechanism that moves the image circle of the projection optical system 23 and the projection region 11. The projection direction changing mechanism is a mechanism that changes a projection direction of the projection portion 1 by changing a direction of the projection portion 1 by mechanical rotation (for example, refer to FIG. 3 and FIG. 4).

<Mechanical Configuration of Projection Apparatus 10>

FIG. 3 is a schematic diagram illustrating an exterior configuration of the projection apparatus 10. FIG. 4 is a schematic cross-sectional view of an optical unit 106 of the projection apparatus 10 illustrated in FIG. 3. FIG. 4 illustrates a cross section in a plane along an optical path of the light emitted from a body part 101 illustrated in FIG. 3.

As illustrated in FIG. 3, the projection apparatus 10 comprises the body part 101 and the optical unit 106 that is provided to protrude from the body part 101. In the configuration illustrated in FIG. 3, the operation reception portion 2, the control device 4, and the light source 21, the light modulation portion 22, and the control circuit 24 in the projection portion 1 are provided in the body part 101. The projection optical system 23 in the projection portion 1 is provided in the optical unit 106.

The optical unit 106 comprises a first member 102 supported by the body part 101 and a second member 103 supported by the first member 102.

The first member 102 and the second member 103 may be an integrated member. The optical unit 106 may be configured to be attachable to and detachable from the body part 101 (in other words, interchangeably configured).

The body part 101 includes a housing 15 (refer to FIG. 4) in which an opening 15a (refer to FIG. 4) for passing light is formed in a part connected to the optical unit 106.

As illustrated in FIG. 3, the light source 21 and a light modulation unit 12 including the light modulation portion 22 (refer to FIG. 2) that generates an image by spatially modulating the light emitted from the light source 21 based on input image data are provided inside the housing 15 of the body part 101.

The light emitted from the light source 21 is incident on the light modulation portion 22 of the light modulation unit 12 and is spatially modulated and emitted by the light modulation portion 22.

As illustrated in FIG. 4, the image formed by the light spatially modulated by the light modulation unit 12 is incident on the optical unit 106 by passing through the opening 15a of the housing 15 and is projected to the projection object 6 as a projection target object. Accordingly, an image G1 is visible from an observer.

As illustrated in FIG. 4, the optical unit 106 comprises the first member 102 including a hollow portion 2A connected to the inside of the body part 101, the second member 103 including a hollow portion 3A connected to the hollow portion 2A, a first optical system 121 and a reflective member 122 arranged in the hollow portion 2A, a second optical system 31, a reflective member 32, a third optical system 33, and a lens 34 arranged in the hollow portion 3A, a shift mechanism 105, and a projection direction changing mechanism 104.

The first member 102 is a member having, for example, a rectangular cross-sectional exterior shape, in which an opening 2a and an opening 2b are formed in surfaces perpendicular to each other. The first member 102 is supported by the body part 101 in a state where the opening 2a is arranged at a position facing the opening 15a of the body part 101. The light emitted from the light modulation portion 22 of the light modulation unit 12 of the body part 101 is incident into the hollow portion 2A of the first member 102 through the opening 15a and the opening 2a.

An incidence direction of the light incident into the hollow portion 2A from the body part 101 will be referred to as a direction X1. A direction opposite to the direction X1 will be referred to as a direction X2. The direction X1 and the direction X2 will be collectively referred to as a direction X. In addition, in FIG. 4, a direction from the front to the back of the page and an opposite direction will be referred to as a direction Z. In the direction Z, the direction from the front to the back of the page will be referred to as a direction Z1, and the direction from the back to the front of the page will be referred to as a direction Z2.

In addition, a direction perpendicular to the direction X and the direction Z will be referred to as a direction Y. In the direction Y, an upward direction in FIG. 4 will be referred to as a direction Y1, and a downward direction in FIG. 4 will be referred to as a direction Y2. In the example in FIG. 4, the projection apparatus 10 is arranged such that the direction Y2 is a vertical direction.

The projection optical system 23 illustrated in FIG. 2 is composed of the first optical system 121, the reflective member 122, the second optical system 31, the reflective member 32, the third optical system 33, and the lens 34. An optical axis K of the projection optical system 23 is illustrated in FIG. 4. The first optical system 121, the reflective member 122, the second optical system 31, the reflective member 32, the third optical system 33, and the lens 34 are arranged in this order from the light modulation portion 22 side along the optical axis K.

The first optical system 121 includes at least one lens and guides the light that is incident on the first member 102 from the body part 101 and that travels in the direction X1, to the reflective member 122.

The reflective member 122 reflects the light incident from the first optical system 121 in the direction Y1. The reflective member 122 is configured with, for example, a mirror. In the first member 102, the opening 2b is formed on the optical path of the light reflected by the reflective member 122, and the reflected light travels to the hollow portion 3A of the second member 103 by passing through the opening 2b.

The second member 103 is a member having an approximately T-shaped cross-sectional exterior shape, in which an opening 3a is formed at a position facing the opening 2b of the first member 102. The light that has passed through the opening 2b of the first member 102 from the body part 101 is incident into the hollow portion 3A of the second member 103 through the opening 3a. The first member 102 and the second member 103 may have any cross-sectional exterior shape and are not limited to the above.

The second optical system 31 includes at least one lens and guides the light incident from the first member 102 to the reflective member 32.

The reflective member 32 guides the light incident from the second optical system 31 to the third optical system 33 by reflecting the light in the direction X2. The reflective member 32 is configured with, for example, a mirror.

The third optical system 33 includes at least one lens and guides the light reflected by the reflective member 32 to the lens 34.

The lens 34 is arranged in an end part of the second member 103 on the direction X2 side in the form of closing the opening 3c formed in this end part. The lens 34 projects the light incident from the third optical system 33 to the projection object 6.

The projection direction changing mechanism 104 is a rotation mechanism that rotatably connects the second member 103 to the first member 102. By the projection direction changing mechanism 104, the second member 103 is configured to be rotatable about a rotation axis (specifically, the optical axis K) that extends in the direction Y. The projection direction changing mechanism 104 is not limited to an arrangement position illustrated in FIG. 4 as long as the projection direction changing mechanism 104 can rotate the optical system. In addition, the number of rotation mechanisms is not limited to one, and a plurality of rotation mechanisms may be provided.

The shift mechanism 105 is a mechanism for moving the optical axis K of the projection optical system (in other words, the optical unit 106) in a direction (direction Y in FIG. 4) perpendicular to the optical axis K. Specifically, the shift mechanism 105 is configured to be capable of changing a position of the first member 102 in the direction Y with respect to the body part 101. The shift mechanism 105 may manually move the first member 102 or electrically move the first member 102.

FIG. 4 illustrates a state where the first member 102 is moved as far as possible to the direction Y1 side by the shift mechanism 105. By moving the first member 102 in the direction Y2 by the shift mechanism 105 from the state illustrated in FIG. 4, a relative position between a center of the image (in other words, a center of a display surface) formed by the light modulation portion 22 and the optical axis K changes, and the image G1 projected to the projection object 6 can be shifted (translated) in the direction Y2.

The shift mechanism 105 may be a mechanism that moves the light modulation portion 22 in the direction Y instead of moving the optical unit 106 in the direction Y. Even in this case, the image G1 projected to the projection object 6 can be moved in the direction Y2.

<Setting Image for Setting Origin and Origin Setting Operation Performed by Operator 51>

FIG. 5 and FIG. 6 are diagrams illustrating Specific Example 1 of a setting image for setting an origin and an origin setting operation. An operator 51 illustrated in FIG. 5 and FIG. 6 is holding an indicator 52 and can provide an instruction for each portion in the projection object 6 using the indicator 52. For example, the indicator 52 has a rod shape, and the instruction can be provided using a tip end.

The indicator 52 includes a sensor that can detect movement of an instruction position of the indicator 52. The detection of the movement of the instruction position includes detection of a movement direction of the instruction position and detection of a movement amount of the instruction position. This sensor includes, for example, an acceleration sensor that can measure three-dimensional acceleration, and is provided at, for example, the tip end of the indicator 52.

The origin setting operation for setting the instruction position of the indicator 52 in the control device 4 as an input value can be performed using the indicator 52. The origin setting operation is an example of a setting operation according to the embodiment of the present invention. For example, a sensor (touch sensor) that detects a contact with the projection object 6 is provided at the tip end of the indicator 52. The origin setting operation is an operation of bringing the tip end of the indicator 52 into contact with the projection object 6, that is, an operation of touching the projection object 6 with the tip end of the indicator 52. This origin setting operation (touch) is an example of an operation of providing an input into an input portion (for example, the touch sensor) provided in the indicator 52.

In addition, the indicator 52 directly or indirectly transmits information such as a detection result of the movement, reception results of the origin setting operation and a first setting operation and a second setting operation, described later, to the control device 4. For example, the indicator 52 can communicate with the operation reception portion 2 of the control device 4 by wireless communication such as short range wireless communication and transmits the information to the control device 4 by wireless communication with the operation reception portion 2.

For example, the indicator 52 detects the movement for a constant period and transmits the detection result to the control device 4 and transmits the reception result of each setting operation to the control device 4 at a point in time when the setting operation is received.

Alternatively, the indicator 52 may detect the movement for the constant period and accumulate the detection result and collectively transmit the accumulated detection result of the movement together with the reception result of the setting operation to the control device 4 at a point in time when the setting operation such as the origin setting operation is received. At this point, the indicator 52 may transmit the entire accumulated detection result of the movement to the control device 4 or may transmit a result of calculating an integrating accumulation of the accumulated detection result of the movement to the control device 4.

The control device 4 acquires information indicating the movement (the movement direction and the movement amount) of the instruction position of the indicator 52 by receiving the information transmitted from the indicator 52. In addition, the control device 4 performs a control of projecting an image 50 including a setting image 50a for setting the origin of the instruction position of the indicator 52 to the projection region 11 from the projection portion 1.

The setting image 50a is an image as a mark for the operator 51 and, in the example in FIG. 5, is a star mark arranged at a position as the origin in the image 50. A shape and the like of the setting image 50a can be decided to be any shape and the like. A position of the setting image 50a can be decided to be any position in the image 50 in advance.

In a case where, for example, the projection region 11 is large, the setting image 50a may be arranged in a relatively lower part of the image 50 so that the operator 51 easily touches the projected setting image 50a using the indicator 52.

Accordingly, by projecting the image 50 including the setting image 50a from the projection portion 1, the control device 4 prompts the operator 51 to perform the origin setting operation in a state where an instruction for the setting image 50a is provided by the indicator 52. At this point, the control device 4 may output a message prompting performing the origin setting operation in a state where the instruction is provided by the indicator 52, to the operator 51 by voice output, screen display, projection using the projection apparatus 10, or the like.

Regarding this point, the operator 51 performs the origin setting operation in a state where the instruction for the setting image 50a is provided by the indicator 52. Specifically, as illustrated in FIG. 6, the operator 51 performs the origin setting operation of touching the part to which the setting image 50a is projected in the projection object 6 with the tip end of the indicator 52.

The control device 4 acquires an input result of the origin setting operation and detects the instruction position of the indicator 52 in the image 50 based on the position of the setting image 50a in the image 50 and the movement (the movement direction and the movement amount) of the instruction position of the indicator 52 after the input result of the origin setting operation is acquired.

That is, the control device 4 recognizes that the instruction position of the indicator 52 at a point in time when the origin setting operation is performed is the position of the setting image 50a in the image 50, and then, detects the instruction position of the indicator 52 in the image 50 based on the movement (the movement direction and the movement amount) of the instruction position of the indicator 52 with respect to the position of the setting image 50a in the image 50 as the origin. For example, the instruction position of the indicator 52 in the image 50 is represented by a pixel position in the image 50.

For example, by calculating the integrating accumulation of the detection result of the movement of the instruction position of the indicator 52 during a period after the origin setting operation is performed, and correcting the position of the setting image 50a (origin) in the image 50 using the result of the integrating accumulation when a specific event (for example, the same touch as the origin setting operation) has occurred, the control device 4 detects the instruction position of the indicator 52 in the image 50 when the event has occurred.

The detection result of the movement of the instruction position includes detection results of the movement direction and the movement amount. The integrating accumulation of the detection result of the movement of the instruction position is calculated such that the movement amount is offset by a difference in the movement direction. For example, in a case where the instruction position moves to the right by 2 cm and then, the instruction position moves to the left by 1 cm, the result of the integrating accumulation of the detection result of the movement of the instruction position is 1 cm to the right.

Alternatively, the control device 4 may detect the instruction position of the indicator 52 in the image 50 while tracking the instruction position by sequentially correcting the position of the setting image 50a in the image 50 using the detection result of the movement of the indicator 52 during the period after the origin setting operation is performed.

Accordingly, for example, the instruction position of the indicator 52 in the image 50 can be detected without capturing the projected image 50 and the indicator 52 using an imaging apparatus. Thus, it is possible to implement the detection of the instruction position of the indicator 52 while suppressing a manufacturing cost and the like of the projection apparatus 10 or of a projection system including the projection apparatus 10.

In detecting the instruction position in the image 50 based on the detection result of the movement of the instruction position of the indicator 52 and the position of the setting image 50a in the image 50, the control device 4 uses first information indicating a relationship between a size of a projection image in the projection object 6 and a size of the image 50 in order to convert the movement amount of the instruction position of the indicator 52 into a movement amount on the image 50.

The size of the image 50 is a size of an image used for projection by the projection apparatus 10 and may be the number of pixels of the image or the size of the image in the light modulation portion 22 (a size of the liquid crystal panel of the light modulation portion 22). For example, the first information is a ratio of the size of the image 50 projected to the projection object 6 and the size of the image used for projection by the projection apparatus 10.

For example, the first information is stored in the storage medium 4a of the control device 4 in advance based on an actual measurement result of the size of the projection region 11. Alternatively, the control device 4 may generate the first information in accordance with an operation performed on the indicator 52 (for example, refer to FIG. 9 to FIG. 18).

FIG. 7 and FIG. 8 are diagrams illustrating Specific Example 2 of the setting image for setting the origin and the origin setting operation. While the setting image 50a arranged at the position as the origin in the image 50 has been described in the examples illustrated in FIG. 5 and FIG. 6 as the setting image for setting the origin of the instruction position of the indicator 52, the setting image is not limited thereto.

For example, as illustrated in FIG. 7, the control device 4 may perform a control of projecting the image 50 including a setting image 50b for setting the origin of the instruction position of the indicator 52 to the projection region 11 from the projection portion 1. In the example in FIG. 7, the setting image 50b corresponds to four arrows indicating the position as the origin in the image 50. As illustrated in FIG. 8, the operator 51 performs the origin setting operation of touching a part indicated by the setting image 50b in the projection object 6 with the tip end of the indicator 52.

That is, the setting image for setting the origin of the instruction position of the indicator 52 is not limited to an image arranged at the origin of the instruction position of the indicator 52 and may be an image indirectly showing the origin of the instruction position of the indicator 52.

<First Operation and Second Operation Performed by Operator of Projection Apparatus 10>

FIG. 9 to FIG. 11 are diagrams illustrating Specific Example 1 of a setting image for generating the first information, the first setting operation, and the second setting operation. As illustrated in FIG. 9, the control device 4 may project the image 50 including setting images 50c and 50d for generating the first information from the projection apparatus 10 before the states illustrated in FIG. 5 and FIG. 6. The setting images 50c and 50d indicate a first position and a second position, respectively, in the image 50 and are figures having a pentagonal shape. Each of the first position and the second position in the image 50 is a predetermined position of the setting image 50a. Shapes and the like of the setting images 50c and 50d can be decided to be any shapes and the like.

Accordingly, by projecting the image 50 including the setting images 50c and 50d from the projection portion 1, the control device 4 prompts the operator 51 to perform the first setting operation in a state where an instruction for the first position in the projection image (projected image 50) is provided by the indicator 52 and then, perform the second setting operation in a state where an instruction for the second position in the projection image is provided by the indicator 52. At this point, the control device 4 may output a message prompting performing the first setting operation in a state where the instruction for the first position in the projection image is provided by the indicator 52 and then, performing the second setting operation in a state where the instruction for the second position in the projection image is provided by the indicator 52, to the operator 51 by voice output, screen display, projection using the projection apparatus 10, or the like.

Regarding this point, the operator 51 performs the first setting operation in a state where the instruction for the first position in the projection image is provided by the indicator 52 and then, performs the second setting operation in a state where the instruction for the second position in the projection image is provided by the indicator 52. Each of the first setting operation and the second setting operation may be the same operation as the origin setting operation or may be an operation different from the origin setting operation. In this example, it is assumed that each of the first setting operation and the second setting operation is an operation of touching the projection object 6 with the tip end of the indicator 52 like the origin setting operation.

For example, as illustrated in FIG. 10, the operator 51 performs the first setting operation of touching a part to which the setting image 50c is projected in the projection object 6 with the tip end of the indicator 52. Then, as illustrated in FIG. 11, the operator 51 performs the second setting operation of touching a part to which the setting image 50d is projected in the projection object 6 with the tip end of the indicator 52.

The control device 4 acquires the first information indicating the relationship between the size of the projection image in the projection object 6 and the size of the image 50 based on the detection result of the movement of the instruction position of the indicator 52 from detection of the first setting operation to detection of the second setting operation.

For example, by calculating the integrating accumulation of the detection result of the movement of the instruction position of the indicator 52 from the detection of the first setting operation to the detection of the second setting operation, the control device 4 can derive a distance between the first position to which the setting image 50c is projected in the projection object 6 and the second position to which the setting image 50d is projected in the projection object 6. In addition, a distance (for example, the number of pixels) between the setting images 50c and 50d in the image 50 is known in the control device 4.

Thus, the control device 4 can derive a ratio of the derived distance between the first position and the second position and the known distance between the setting images 50c and 50d as the first information indicating the relationship between the size of the projection image in the projection object 6 and the size of the image 50.

For example, the control device 4 projects the image 50 including the setting image 50a from the projection apparatus 10 as illustrated in FIG. 5, sets the origin of the instruction position of the indicator 52 in accordance with the origin setting operation illustrated in FIG. 6, and then, detects the instruction position of the indicator 52 based on the acquired first information.

In addition, for example, the setting image 50d (FIG. 9 to FIG. 11) indicating the second position may double as the setting image 50a (FIG. 5 and the like) for setting the origin. Furthermore, the second setting operation (FIG. 11) may double as the origin setting operation (FIG. 6 and the like). That is, in a case where the second setting operation illustrated in FIG. 11 is performed, the control device 4 may set the second position indicated by the setting image 50d as the origin of the instruction position of the indicator 52. In this case, the operator 51 may not perform the origin setting operation separately from the second setting operation.

FIG. 12 to FIG. 14 are diagrams illustrating Specific Example 2 of the setting image for generating the first information, the first setting operation, and the second setting operation. For example, as illustrated in FIG. 12, the control device 4 may first perform a control of projecting the image 50 that includes the setting image 50c and that does not include the setting image 50d, to the projection region 11 from the projection portion 1. As illustrated in FIG. 13, the operator 51 performs the first setting operation of touching the part to which the setting image 50c is projected in the projection object 6 with the tip end of the indicator 52.

In a case where the first setting operation is detected, the control device 4 performs a control of projecting the image 50 that includes the setting image 50d and that does not include the setting image 50c, to the projection region 11 from the projection portion 1 as illustrated in FIG. 14. As illustrated in FIG. 14, the operator 51 performs the second setting operation of touching the part to which the setting image 50d is projected in the projection object 6 with the tip end of the indicator 52.

Accordingly, the control device 4 may project the image 50 including the setting image 50c indicating the first position in the image 50 from the projection apparatus 10 and then, project the image 50 including the setting image 50d indicating the second position in the image 50 from the projection apparatus 10. Accordingly, the operator 51 can be prompted to perform the first setting operation in a state where the instruction for the first position in the projection image (projected image 50) is provided by the indicator 52 and then, perform the second setting operation in a state where the instruction for the second position in the projection image is provided by the indicator 52. Even in this case, the control device 4 acquires the first information based on the movement of the instruction position of the indicator 52 from the detection of the first setting operation to the detection of the second setting operation as in the examples illustrated in FIG. 9 to FIG. 11.

FIG. 15 to FIG. 18 are diagrams illustrating Specific Example 3 of the setting image for generating the first information, the first setting operation, and the second setting operation. For example, as illustrated in FIG. 15, the control device 4 may perform a control of projecting the image 50 including a setting image 50e for generating the first information to the projection region 11 from the projection portion 1.

The setting image 50e is a figure having a shape in which the setting images 50c and 50d illustrated in FIG. 9 to FIG. 11 are connected by a horizontally long rectangle. A first end part (a part having a pentagonal shape) of the setting image 50e indicates the first position, and a second end part (a part having a pentagonal shape) of the setting image 50e indicates the second position.

As illustrated in FIG. 16, the operator 51 performs the first setting operation of touching a part to which the first end part of the setting image 50e is projected in the projection object 6 with the tip end of the indicator 52. Then, as the second setting operation, the operator 51 moves the instruction position of the indicator 52 to the second end part of the setting image 50e from the first end part of the setting image 50e while maintaining the tip end of the indicator 52 in contact with the projection object 6 as illustrated in FIG. 17, and separates the tip end of the indicator 52 from the projection object 6 as illustrated in FIG. 18.

The control device 4 acquires the first information indicating the relationship between the size of the projection image in the projection object 6 and the size of the image 50 based on the detection result of the movement of the instruction position of the indicator 52 from the touch on the projection object 6 with the tip end of the indicator 52 (from the detection of the first setting operation) to the separation of the tip end of the indicator 52 from the projection object 6 (to the detection of the second setting operation).

Accordingly, the second setting operation in a state where the instruction for the second position is provided by the indicator 52 may be an operation of separating the tip end of the indicator 52 from the projection object 6 from a state where the tip end of the indicator 52 is brought into contact with a part corresponding to the second position in the projection object 6.

<Processing Performed by Control Device 4>

Figure 19:
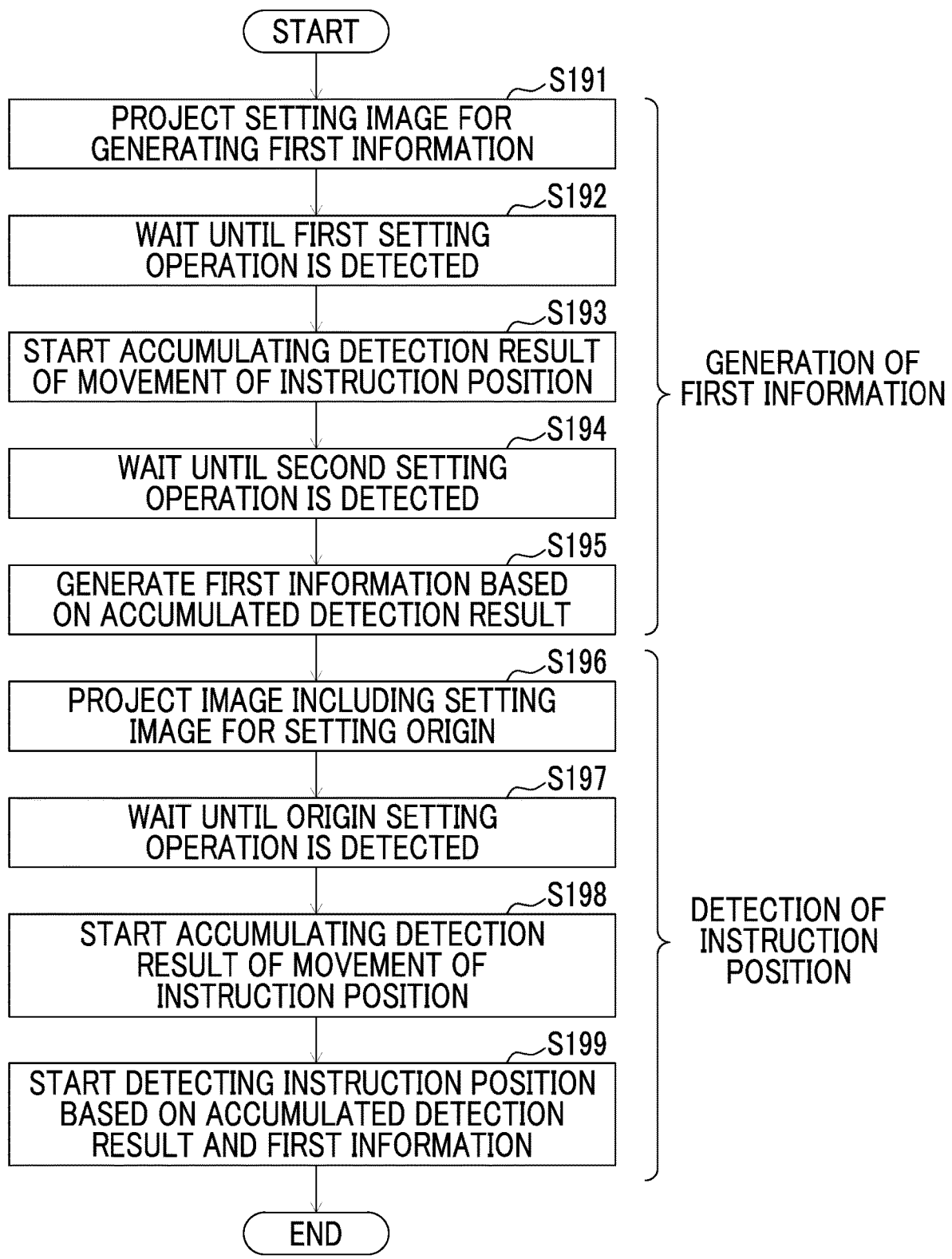
FIG. 19 is a flowchart illustrating an example of processing performed by a control device 4.

FIG. 19 is a flowchart illustrating an example of processing performed by the control device 4. For example, the control device 4 executes the processing illustrated in FIG. 19 at a time of a start of instruction position detection. The processing illustrated in FIG. 19 is divided into processing (steps S191 to S195) for generating the first information and processing (steps S196 to S199) for detecting the instruction position based on the first information.

First, the control device 4 projects the image 50 including the setting image for generating the first information from the projection apparatus 10 (step S191). As an example, the control device 4 projects the image 50 including the setting images 50c and 50d from the projection apparatus 10 as illustrated in FIG. 9.

Next, the control device 4 waits until the first setting operation is detected (step S192). As an example, the control device 4 waits until a touch (for example, refer to FIG. 10) on the projection object 6 with the tip end of the indicator 52 for the first time is detected as the first setting operation. In a case where the first setting operation is detected, the control device 4 starts accumulating the detection result of the movement of the instruction position of the indicator 52 (step S193).

Next, the control device 4 waits until the second setting operation is detected (step S194). As an example, the control device 4 waits until a touch (for example, refer to FIG. 11) on the projection object 6 with the tip end of the indicator 52 for the second time is detected as the second setting operation. In a case where the second setting operation is detected, the control device 4 generates the first information based on the detection result of which the accumulation has started from step S193 (step S195).

Next, the control device 4 projects the image 50 including the setting image for setting the origin of the instruction position of the indicator 52 from the projection apparatus 10 (step S196). As an example, the control device 4 projects the image 50 including the setting image 50a from the projection apparatus 10 as illustrated in FIG. 5.

Next, the control device 4 waits until the origin setting operation is detected (step S197). As an example, the control device 4 waits until a touch (for example, refer to FIG. 6) on the projection object 6 with the tip end of the indicator 52 for the third time is detected as the origin setting operation. In a case where the origin setting operation is detected, the control device 4 starts accumulating the detection result of the movement of the instruction position of the indicator 52 (step S198).

Next, the control device 4 starts detecting the instruction position of the indicator 52 based on the detection result of which the accumulation has started from step S198, and on the first information generated in step S195 (step S199) and finishes the series of processing at the time of the start of the instruction position detection.

For example, in a case where the first information is stored in the storage medium 4a of the control device 4 in advance based on the actual measurement result of the size of the projection region 11, the control device 4 may omit the processing (steps S191 to S195) for generating the first information and start the processing from step S196. In this case, the control device 4 starts detecting the instruction position based on the first information stored in the storage medium 4a in step S199.

<Processing Corresponding to Change in Distance between Projection Apparatus 10 and Projection Object 6>

For example, in a case where at least any of the projection apparatus 10 or the projection object 6 moves, and a distance between the projection apparatus 10 and the projection object 6 (projection image) changes, the relationship between the size of the projection image in the projection object 6 and the size of the image 50 changes. Thus, the control device 4 may execute the processing illustrated in FIG. 19 in a case where a change in the distance between the projection apparatus 10 and the projection object 6 is detected. Accordingly, even in a case where the distance between the projection apparatus 10 and the projection object 6 changes, the detection of the instruction position of the indicator 52 can be continued.

For example, the control device 4 can detect the change in the distance between the projection apparatus 10 and the projection object 6 based on a distance-measuring sensor comprised in the projection apparatus 10. Alternatively, the control device 4 can detect the change in the distance between the projection apparatus 10 and the projection object 6 based on a change in state (focus position) of a focus lens included in the projection optical system 23 of the projection apparatus 10. The change in the state of the focus lens includes a change in the focus position caused by manual focus and a change in the focus position caused by autofocus.

<Processing Corresponding to Change in Focal Length in Projection Lens of Projection Apparatus 10>

For example, in a case where a focal length of a projection lens included in the projection optical system 23 of the projection apparatus 10 changes, the distance between the projection apparatus 10 and the projection object 6 changes, and there is a strong possibility that the relationship between the size of the projection image in the projection object 6 and the size of the image 50 changes. Thus, the control device 4 may execute the processing illustrated in FIG. 19 in a case where a change in the focal length of the projection lens included in the projection optical system 23 of the projection apparatus 10 is detected. Accordingly, even in a case where the distance between the projection apparatus 10 and the projection object 6 changes, the detection of the instruction position of the indicator 52 can be continued.

For example, in a case where a zoom lens is included in the projection optical system 23 as the projection lens, and a focal length of the zoom lens changes, the control device 4 can detect the change in the focal length of the zoom lens based on a signal from the control circuit 24 of the projection portion 1. In addition, in a case where the projection lens of the projection optical system 23 is interchangeable, and the projection lens of the projection optical system 23 is interchanged with a lens having a different focal length, the control device 4 can detect the change in the focal length caused by the lens interchange based on the signal from the control circuit 24 of the projection portion 1.

<Processing for Each Constant Time>

As described above, the control device 4 can detect the instruction position of the indicator 52 by calculating the integrating accumulation of the detection result of the movement of the instruction position of the indicator 52 after the origin setting operation is performed. However, as time elapses after the origin setting operation is performed, error in the detection result is accumulated, and detection accuracy of the instruction position of the indicator 52 is decreased.

Thus, for example, the control device 4 may execute steps S196 to S199 illustrated in FIG. 19 for each constant time after the series of processing illustrated in FIG. 19 is executed. Accordingly, the origin can be set again for each constant time, and a decrease in the detection accuracy caused by the accumulation of the error in the detection result can be suppressed.

<Example of Control of Position of Setting Image Based on Detection Result of Instruction Position>

FIG. 20 is a diagram illustrating an example of a control of the position of the setting image based on the detection result of the instruction position. In projecting the image 50 including the setting image for setting the origin of the instruction position of the indicator 52 from the projection apparatus 10 after the instruction position of the indicator 52 is detected, the control device 4 may perform a control of changing the position of the setting image in the image 50 based on the detection result of the instruction position.

For example, as described above, it is assumed that the control device 4 performs steps S196 to S199 illustrated in FIG. 19 for each constant time. In addition, it is assumed that in step S196, the control device 4 projects the image 50 including the setting image 50a from the projection apparatus 10 as illustrated in FIG. 5. In addition, two regions obtained by dividing the image 50 into two left and right regions will be described here.

In step S196, the control device 4 determines whether the instruction position of the indicator 52 detected immediately previously is included in the left region in the image 50 or the right region in the image 50.

In a case where it is determined that the instruction position detected immediately previously is included in the right region in the image 50, there is a strong possibility that the indicator 52 is positioned near the right region in the image 50 projected to the projection object 6. In this case, as illustrated in FIG. 5, the control device 4 projects the image 50 in which the setting image 50a is included in the right region from the projection apparatus 10.

On the other hand, in a case where it is determined that the instruction position detected immediately previously is included in the left region in the image 50, there is a strong possibility that the indicator 52 is positioned near the left region in the image 50 projected to the projection object 6. In this case, as illustrated in FIG. 20, the control device 4 projects the image 50 in which the setting image 50a is included in the left region from the projection apparatus 10.

Accordingly, in step S196, the setting image 50a can be projected to a position at which the operator 51 easily performs the origin setting operation. Thus, an operation load of the operator 51 can be reduced.

While the two regions obtained by dividing the image 50 into two regions have been described, the setting image 50a may be divided in further detail, and the control device 4 may control the position of the setting image 50a in the image 50 in further detail.

<Example of Control of Position of Setting Image Based on Installation State of Projection Apparatus 10>

Figure 21:
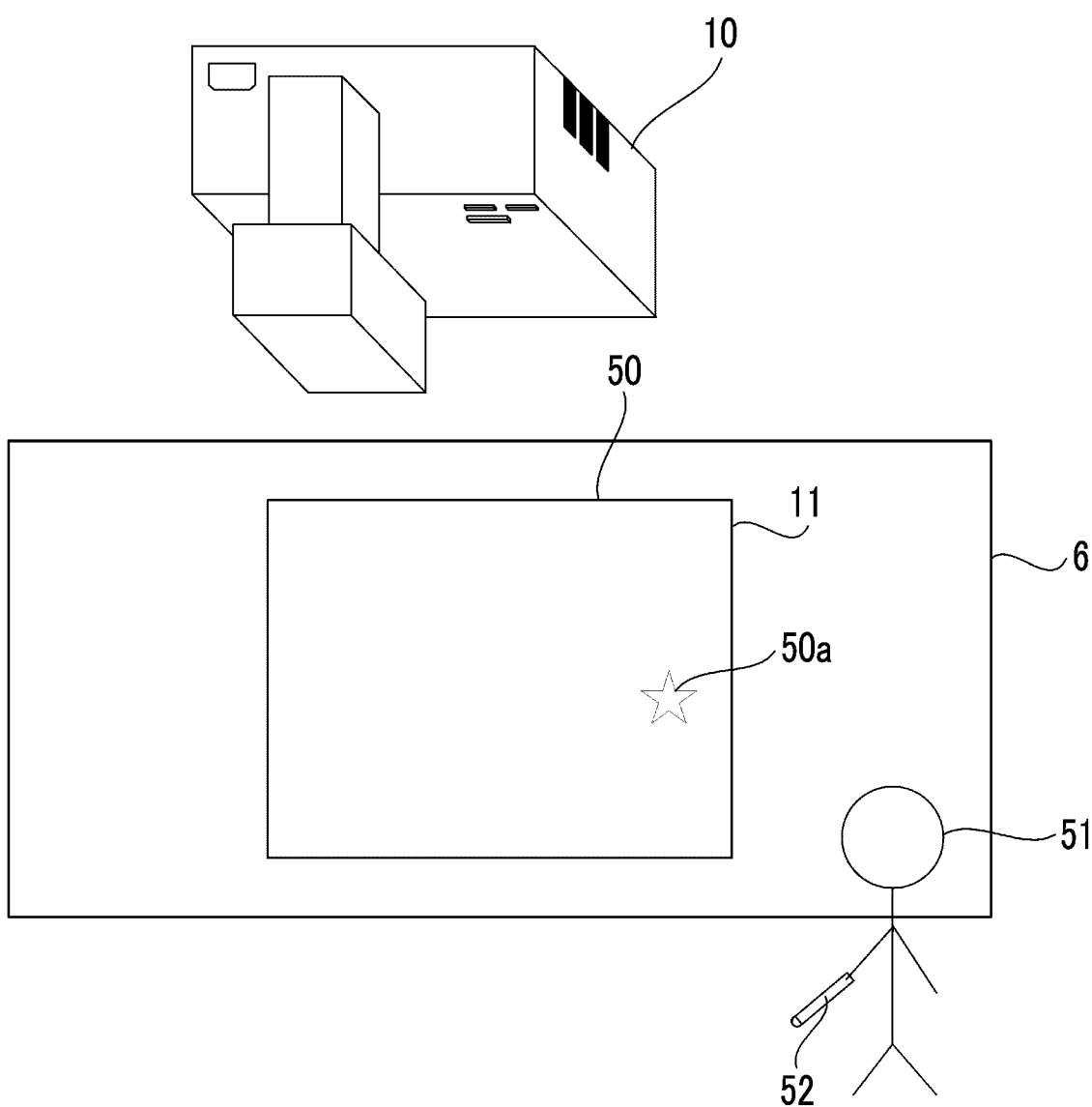
FIG. 21 is a diagram illustrating an example of a control of the position of the setting image based on an installation state of the projection apparatus 10.

FIG. 21 is a diagram illustrating an example of a control of the position of the setting image based on an installation state of the projection apparatus 10. The control device 4 may perform a control of changing the position of the setting image in the image 50 based on the installation state of the projection apparatus 10.

For example, in the example illustrated in FIG. 5 and the like, the projection apparatus 10 is installed in a state where the projection apparatus 10 is placed on a floor or the like. In a case where the projection region 11 in the projection object 6 is large in an up-down direction, projecting the setting image 50a to a relatively lower part in the image 50 as illustrated in FIG. 5 makes the operator 51 easily perform the origin setting operation (a touch on the projected setting image 50a).

On the other hand, as illustrated in FIG. 21, in a case where the projection apparatus 10 is installed in a state where the projection apparatus 10 is suspended from a ceiling or the like, and the projection apparatus 10 is inverted upside down with respect to the example in FIG. 5, the image 50 is also inverted upside down. Accordingly, the setting image 50a is projected to a relatively upper part in the image 50, and it is difficult for the operator 51 to perform the origin setting operation.

Regarding this point, in a case where the projection apparatus 10 is installed in a state where the projection apparatus 10 is inverted upside down, the control device 4 changes the position of the setting image 50a in the image 50 so that the setting image 50a is projected to a relatively lower part in the image 50. Accordingly, the operator 51 easily performs the origin setting operation independently of the installation state of the projection apparatus 10.

For example, the control device 4 can detect the installation state of the projection apparatus 10 based on a detection result of a horizontal level sensor or the like provided in the projection apparatus 10. Alternatively, the user (for example, the operator 51) can set the installation state of the projection apparatus 10 in the control device 4, and the control device 4 can detect the installation state of the projection apparatus 10 based on the setting from the user.

In addition, for the setting image such as the setting image 50a that is not symmetric in the up-down direction, the control device 4 may project the image 50 including the setting image 50a that is inverted in the up-down direction from the projection apparatus 10 so that the projected setting image 50a is not inverted upside down.

As described above, according to the projection apparatus 10, it is possible to project the image 50 including the setting image 50a for setting the origin of the instruction position of the indicator 52 from the projection apparatus 10, acquire the input result of the setting operation of the operator 51 in a state where the instruction for the position indicated by the setting image 50a in the projection image is provided by the indicator 52, and detect the instruction position of the indicator 52 in the image 50 based on the position of the setting image 50a in the image 50 and the movement amount of the instruction position after the input result of the setting operation is acquired.

Accordingly, for example, the instruction position of the indicator 52 in the image used for projection can be detected without capturing the projected image 50 and the indicator 52 using the imaging apparatus. Thus, it is possible to implement the detection of the instruction position of the indicator 52 while suppressing the manufacturing cost and the like of the projection apparatus 10 or the projection system including the projection apparatus 10.

Modification Example 1

While an operation of touching the projection object 6 with the tip end of the indicator 52 has been described as an example of the origin setting operation of providing an input into the input portion provided in the indicator 52, the origin setting operation of providing an input into the input portion provided in the indicator 52 may be, for example, an operation of pushing a button provided in the indicator 52.

In addition, the origin setting operation is not limited to an operation of providing an input into the input portion provided in the indicator 52 and may be an operation of providing an input into an input portion provided in the projection object 6 (projection surface) to which the projection image is projected. For example, a touch sensor may be provided in the projection object 6, and the origin setting operation may be an operation of providing an input into the input portion (touch sensor) provided in the projection object 6 (projection surface) by touching the projection object 6 with the tip end of the indicator 52.

While the origin setting operation has been described, the same modification can also be made to the first setting operation and the second setting operation.

Modification Example 2

While a case of applying the instruction position detection device of the embodiment to the projection apparatus 10 has been described, the present invention is not limited to such a configuration. For example, the instruction position detection device of the embodiment may be other apparatuses that can directly or indirectly communicate with the projection apparatus 10. For example, the instruction position detection device of the embodiment may be a personal computer that can communicate with the projection apparatus 10. In this case, the instruction position detection device of the embodiment communicates with the projection apparatus 10 to execute the processing of the instruction position detection.

At least the following matters are disclosed in the present specification.

(1)

An instruction position detection device comprising a processor that acquires a movement amount of an instruction position of an indicator capable of detecting the movement amount, and performs a control of projecting an image including a setting image for setting an origin of the instruction position of the indicator from a projection apparatus, in which the processor is configured to acquire an input result of a setting operation of an operator in a state where an instruction for a position indicated by the setting image in a projected projection image is provided by the indicator, and perform a control of detecting the instruction position of the indicator in the image based on the position of the setting image in the image and the movement amount after the input result of the setting operation is acquired.

(2)

The instruction position detection device according to (1), in which the setting operation includes an operation of providing an input into an input portion provided in the indicator.

(3)

The instruction position detection device according to (1) or (2), in which the setting operation includes an operation of providing an input into an input portion provided in a projection surface to which the projection image is projected.

(4)

The instruction position detection device according to any one of (1) to (3), in which the processor is configured to, based on first information indicating a relationship between a size of the projection image and a size of the image, the position of the setting image in the image, and the movement amount after the setting operation is detected, perform a control of detecting the instruction position of the indicator in the image.

(5)

The instruction position detection device according to (4), in which the processor is configured to perform a control of projecting an image including a setting image indicating a first position and a second position in the image from the projection apparatus, prompt the operator to perform a first setting operation in a state where an instruction for the first position in the projection image is provided by the indicator and then, perform a second setting operation in a state where an instruction for the second position in the projection image is provided by the indicator, and perform a control of acquiring the first information based on a detection result of the indicator from detection of the first setting operation to detection of the second setting operation.

(6)

The instruction position detection device according to (4), in which the processor is configured to perform a control of projecting an image including a setting image indicating a first position in the image from the projection apparatus and then, projecting an image including a setting image indicating a second position in the image from the projection apparatus, prompt the operator to perform a first setting operation in a state where an instruction for the first position in the projection image is provided by the indicator and then, perform a second setting operation in a state where an instruction for the second position in the projection image is provided by the indicator, and perform a control of acquiring the first information based on the movement amount from detection of the first setting operation to detection of the second setting operation.

(7)

The instruction position detection device according to any one of (1) to (6), in which the processor is configured to perform a control of projecting the image from the projection apparatus in accordance with a change in distance between the projection apparatus and the projection image.

(8)

The instruction position detection device according to any one of (1) to (7), in which the processor is configured to perform a control of projecting the image from the projection apparatus in accordance with a change in focal length of a projection lens of the projection apparatus.

(9)

The instruction position detection device according to any one of (1) to (8), in which the processor is configured to perform a control of projecting the image from the projection apparatus for each constant time.

(10)

The instruction position detection device according to any one of (1) to (9), in which the processor is configured to perform a control of changing the position of the setting image in the image in accordance with the detected instruction position.

(11)

The instruction position detection device according to any one of (1) to (10), in which the processor is configured to perform a control of changing the position of the setting image in the image in accordance with an installation state of the projection apparatus.

(12)

An instruction position detection method comprising, by a processor of an instruction position detection device, acquiring a movement amount of an instruction position of an indicator capable of detecting the movement amount, performing a control of projecting an image including a setting image for setting an origin of the instruction position of the indicator from a projection apparatus, acquiring an input result of a setting operation of an operator in a state where an instruction for a position indicated by the setting image in a projected projection image is provided by the indicator, and performing a control of detecting the instruction position of the indicator in the image based on the position of the setting image in the image and the movement amount after the input result of the setting operation is acquired.

(13)

The instruction position detection method according to (12), in which the setting operation includes an operation of providing an input into an input portion provided in the indicator.

(14)

The instruction position detection method according to (12) or (13), in which the setting operation includes an operation of providing an input into an input portion provided in a projection surface to which the projection image is projected.

(15)

The instruction position detection method according to any one of (12) to (14), in which the processor is configured to, based on first information indicating a relationship between a size of the projection image and a size of the image, the position of the setting image in the image, and the movement amount after the setting operation is detected, perform a control of detecting the instruction position of the indicator in the image.

(16)

The instruction position detection method according to (15), in which the processor is configured to perform a control of projecting an image including a setting image indicating a first position and a second position in the image from the projection apparatus, prompt the operator to perform a first setting operation in a state where an instruction for the first position in the projection image is provided by the indicator and then, perform a second setting operation in a state where an instruction for the second position in the projection image is provided by the indicator, and perform a control of acquiring the first information based on a detection result of the indicator from detection of the first setting operation to detection of the second setting operation.

(17)

The instruction position detection method according to (15), in which the processor is configured to perform a control of projecting an image including a setting image indicating a first position in the image from the projection apparatus and then, projecting an image including a setting image indicating a second position in the image from the projection apparatus, prompt the operator to perform a first setting operation in a state where an instruction for the first position in the projection image is provided by the indicator and then, perform a second setting operation in a state where an instruction for the second position in the projection image is provided by the indicator, and perform a control of acquiring the first information based on the movement amount from detection of the first setting operation to detection of the second setting operation.

(18)

The instruction position detection method according to any one of (12) to (17), in which the processor is configured to perform a control of projecting the image from the projection apparatus in accordance with a change in distance between the projection apparatus and the projection image.

(19) The instruction position detection method according to any one of (12) to (18), in which the processor is configured to perform a control of projecting the image from the projection apparatus in accordance with a change in focal length of a projection lens of the projection apparatus.

(20) The instruction position detection method according to any one of (12) to (19), in which the processor is configured to perform a control of projecting the image from the projection apparatus for each constant time.

(21) The instruction position detection method according to any one of (12) to (20), in which the processor is configured to perform a control of changing the position of the setting image in the image in accordance with the detected instruction position.

(22) The instruction position detection method according to any one of (12) to (21), in which the processor is configured to perform a control of changing the position of the setting image in the image in accordance with an installation state of the projection apparatus.

(23) An instruction position detection program causing a processor of an instruction position detection device to execute a process comprising acquiring a movement amount of an instruction position of an indicator capable of detecting the movement amount, performing a control of projecting an image including a setting image for setting an origin of the instruction position of the indicator from a projection apparatus, acquiring an input result of a setting operation of an operator in a state where an instruction for a position indicated by the setting image in a projected projection image is provided by the indicator, and performing a control of detecting the instruction position of the indicator in the image based on the position of the setting image in the image and the movement amount after the input result of the setting operation is acquired.

(24) A projection system comprising a projection apparatus, and an instruction position detection device that acquires a movement amount of an instruction position of an indicator capable of detecting the movement amount, performs a control of projecting an image including a setting image for setting an origin of the instruction position of the indicator from the projection apparatus, acquires an input result of a setting operation of an operator in a state where an instruction for a position indicated by the setting image in a projected projection image is provided by the indicator, and detects the instruction position of the indicator in the image based on the position of the setting image in the image and the movement amount after the input result of the setting operation is acquired.

While various embodiments have been described above with reference to the drawings, the present invention is not limited to such examples. It is apparent that those skilled in the art may perceive various modification examples or correction examples within the scope disclosed in the claims, and those examples are also understood as falling in the technical scope of the present invention. In addition, any combination of various constituents in the embodiment may be used without departing from the gist of the invention.

The present application is based on Japanese Patent Application (JP2020-144981) filed on Aug. 28, 2020, the content of which is incorporated in the present application by reference.

EXPLANATION OF REFERENCES

1: projection portion
1, 2: direction X
1, 2: direction Z
1. 2: direction Y
2: operation reception portion
2A, 3A: hollow portion
2a, 2b, 3a, 3c, 15a: opening
4: control device
4a: storage medium
6: projection object
10: projection apparatus
11: projection region
12: light modulation unit
15: housing
21: light source
22: light modulation portion
23: projection optical system
24: control circuit
31: second optical system
32, 122: reflective member
33: third optical system
34: lens
50: image
50a, 50b, 50c, 50d, 50e: setting image
51: operator
52: indicator
101: body part
102: first member
103: second member
104: projection direction changing mechanism
105: shift mechanism
106: optical unit
121: first optical system
G1: image

What is claimed is:

1. An instruction position detection device comprising: a processor that acquires a movement amount of an instruction position of an indicator capable of detecting the movement amount, and performs a control of projecting, from a projection apparatus, an image including a setting image for setting an origin of the instruction position of the indicator, wherein the processor is configured to: prompt an operator to instruct, by the indicator, a first position and a second position in a projected projection image, and acquire first information indicating a relationship between a size of the projection image and a size of the image based on a detection result of the movement amount from the first position being instructed to the second position being instructed; acquire an input result of a setting operation of the operator in a state where an instruction for a position indicated by the setting image in the projected projection image is provided by the indicator; and perform a control of detecting the instruction position of the indicator in the image based on the position of the setting image in the image, the movement amount after the input result of the setting operation is acquired, and the first information.

2. The instruction position detection device according to claim 1, wherein the setting operation includes an operation of providing an input into an input portion provided in the indicator.

3. The instruction position detection device according to claim 1, wherein the setting operation includes an operation of providing an input into an input portion provided in a projection surface to which the projection image is projected.

4. The instruction position detection device according to claim 1, wherein the processor is configured to: perform a control of projecting, from the projection apparatus, an image including a setting image indicating a first position and a second position in the image; prompt the operator to perform a first setting operation in a state where an instruction for the first position in the projection image is provided by the indicator and then, perform a second setting operation in a state where an instruction for the second position in the projection image is provided by the indicator; and perform a control of acquiring the first information based on a detection result of the indicator from detection of the first setting operation to detection of the second setting operation.

5. The instruction position detection device according to claim 1, wherein the processor is configured to: perform a control of projecting an image including a setting image indicating a first position in the image from the projection apparatus and then, projecting an image including a setting image indicating a second position in the image from the projection apparatus; prompt the operator to perform a first setting operation in a state where an instruction for the first position in the projection image is provided by the indicator and then, perform a second setting operation in a state where an instruction for the second position in the projection image is provided by the indicator; and perform a control of acquiring the first information based on the movement amount from detection of the first setting operation to detection of the second setting operation.

6. The instruction position detection device according to claim 1, wherein the processor is configured to perform a control of projecting the image from the projection apparatus in accordance with a change in distance between the projection apparatus and the projection image.

7. The instruction position detection device according to claim 1, wherein the processor is configured to perform a control of projecting the image from the projection apparatus in accordance with a change in focal length of a projection lens of the projection apparatus.

8. The instruction position detection device according to claim 1, wherein the processor is configured to perform a control of projecting the image from the projection apparatus for each constant time.

9. An instruction position detection method comprising: by a processor of an instruction position detection device, acquiring a movement amount of an instruction position of an indicator capable of detecting the movement amount; performing a control of projecting, from a projection apparatus, an image including a setting image for setting an origin of the instruction position of the indicator; prompting an operator to instruct, by the indicator, a first position and a second position in a projected projection image, and acquiring first information indicating a relationship between a size of the projection image and a size of the image based on a detection result of the movement amount from the first position being instructed to the second position being instructed; acquiring an input result of a setting operation of the operator in a state where an instruction for a position indicated by the setting image in the projected projection image is provided by the indicator; and performing a control of detecting the instruction position of the indicator in the image based on the position of the setting image in the image, the movement amount after the input result of the setting operation is acquired, and the first information.

10. The instruction position detection method according to claim 9, wherein the setting operation includes an operation of providing an input into an input portion provided in the indicator.

11. The instruction position detection method according to claim 9, wherein the setting operation includes an operation of providing an input into an input portion provided in a projection surface to which the projection image is projected.

12. The instruction position detection method according to claim 9, comprising: by the processor, performing a control of projecting, from the projection apparatus, an image including a setting image indicating a first position and a second position in the image; prompting the operator to perform a first setting operation in a state where an instruction for the first position in the projection image is provided by the indicator and then, performing a second setting operation in a state where an instruction for the second position in the projection image is provided by the indicator; and performing a control of acquiring the first information based on a detection result of the indicator from detection of the first setting operation to detection of the second setting operation.

13. The instruction position detection method according to claim 9, comprising: by the processor: performing a control of projecting an image including a setting image indicating a first position in the image from the projection apparatus and then, projecting an image including a setting image indicating a second position in the image from the projection apparatus; prompting the operator to perform a first setting operation in a state where an instruction for the first position in the projection image is provided by the indicator and then, perform a second setting operation in a state where an instruction for the second position in the projection image is provided by the indicator; and performing a control of acquiring the first information based on the movement amount from detection of the first setting operation to detection of the second setting operation.

14. The instruction position detection method according to claim 9, comprising: by the processor, performing a control of projecting the image from the projection apparatus in accordance with a change in distance between the projection apparatus and the projection image.

15. The instruction position detection method according to claim 9, comprising: by the processor, performing a control of projecting the image from the projection apparatus in accordance with a change in focal length of a projection lens of the projection apparatus.

16. The instruction position detection method according to claim 9, comprising: by the processor, performing a control of projecting the image from the projection apparatus for each constant time.

* * * * *